(12) United States Patent
Endo et al.

(10) Patent No.: US 8,033,669 B2
(45) Date of Patent: Oct. 11, 2011

(54) PROJECTION DISPLAY APPARATUS AND METHOD

(75) Inventors: Takao Endo, Tokyo (JP); Yuzo Nakano, Tokyo (JP); Takeshi Utakoji, Tokyo (JP); Yasuharu Koyata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1042 days.

(21) Appl. No.: 11/860,757

(22) Filed: Sep. 25, 2007

(65) Prior Publication Data

US 2008/0180643 A1 Jul. 31, 2008

(30) Foreign Application Priority Data

Jan. 25, 2007 (JP) .................................. 2007-014449

(51) Int. Cl.
*G03B 21/22* (2006.01)
(52) U.S. Cl. .......................................... 353/74; 353/119
(58) Field of Classification Search .................. 348/747, 348/787; 353/75–78; 359/443
See application file for complete search history.

(56) References Cited

U.S. PATENT DOCUMENTS

| | | | | |
|---|---|---|---|---|
| 5,582,473 A * | 12/1996 | Toide et al. | ...................... | 353/74 |
| 5,671,993 A * | 9/1997 | Shikama | .......................... | 353/77 |
| 5,829,855 A * | 11/1998 | Uchiyama | ........................ | 353/74 |
| 6,467,911 B1 * | 10/2002 | Ueyama et al. | .................. | 353/87 |
| 6,520,647 B2 * | 2/2003 | Raskar | ............................ | 353/70 |
| 7,334,901 B2 * | 2/2008 | El-Ghoroury | ................... | 353/94 |
| 7,465,054 B2 * | 12/2008 | Howard et al. | ................ | 353/122 |
| 2004/0036970 A1 * | 2/2004 | Kamei | ........................... | 359/443 |
| 2004/0041988 A1 * | 3/2004 | Kitamura | ........................ | 353/99 |
| 2006/0061736 A1 * | 3/2006 | Iwase | ............................... | 353/61 |
| 2006/0232751 A1 * | 10/2006 | Kobayashi et al. | ............. | 353/52 |
| 2007/0115548 A1 * | 5/2007 | Ebina et al. | .................... | 359/460 |

FOREIGN PATENT DOCUMENTS

| | | | |
|---|---|---|---|
| JP | 2000-267621 | | 9/2000 |
| JP | 2002281532 A | * | 9/2002 |

OTHER PUBLICATIONS

Machine Translations of abstract and application of JP 2002-281532.*

* cited by examiner

*Primary Examiner* — Que T Le
*Assistant Examiner* — Jerry Brooks
(74) *Attorney, Agent, or Firm* — Oblon, Spivak, McClelland, Maier & Neustadt, L.L.P.

(57) ABSTRACT

Not only abnormality of a light output to an exterior but also overturning, vibration, disassembly, deformation, or breakage of a display apparatus including a case and a screen are reliably and promptly detected. A projection display apparatus includes a light source (22) for generating illumination light, which is provided in a case (28) having a light-shielding function, a movable aperture (23) for adjusting the amount of illumination light from the light source (22), a light valve (9) for adjusting the amount of light based on an image signal to generate image light for forming an image from the illumination light, a projection optical system (10) for enlarging the image light from the light valve (9), and a transmission-type screen (29) for displaying the image, which is provided to a window of the case (28). The projection display apparatus further includes first to ninth detectors (41 to 49) for detecting the abnormality of the light output of the light source (22) to the exterior and the abnormality of the case (28) or the transmission-type screen (29), a warning and alarm unit (30) for notifying the abnormality by sound or light, and a control unit (32) for controlling an internal operation when the abnormality is detected.

17 Claims, 18 Drawing Sheets

PROJECTION DISPLAY APPARATUS AND METHOD

BACKGROUND OF THE INVENTION

1. Field of the Invention

The present invention relates to a projection display apparatus and method, and more particularly, to a projection display apparatus including a modulation light source and a transmission-type screen.

2. Description of the Related Art

A projection display apparatus is used to display an image on a screen using a laser light source. Unlike, a cathode ray tube (CRT) display and a plasma display panel (PDP), the projection display apparatus is a non-light emission display apparatus and includes a light valve for adjusting the amount of light based on an image signal, an illumination optical system for illuminating the light valve with illumination light from a light source, and a projection optical system for enlargedly projecting a small image formed by the light valve onto a large screen.

The projection display apparatus is classified into a rear projection type for projecting image light onto a screen from the rear side of the screen as viewed from a viewer and a front projection type for projecting image light onto the screen from the front side of the screen as viewed from the viewer. As shown in FIG. 1, a transmission-type screen 29 used for the rear projection type includes a Fresnel lens screen (Fresnel optical element) 2 for bending image light 16 from a projector 1 to a viewer 8 side and a light diffusing means 3 for diffusing the image light in a predetermined dispersion angle range. In FIG. 1, reference numeral 4 denotes a Fresnel lens substrate, 5 denotes a light exit side Fresnel lens, 6 denotes a lens component, and 7 denotes a light diffusion sheet. The Fresnel lens screen 2 (Fresnel optical element) includes the Fresnel lens substrate 4 and the light exit side Fresnel lens 5. The light diffusing means 3 includes the lens component 6 and the light diffusion sheet 7. In addition, in FIG. 1, reference numeral 9 denotes a light valve, 10 denotes a projection optical system, 11 denotes a illumination optical system, and 22 denotes a light source. The projector 1 includes the light source 22, the illumination optical system 11, the light valve 9, and the projection optical system 10. Further, in FIG. 1, reference numeral 17 denotes a reflecting mirror.

For example, when light from a light source whose light emission area and beam divergence point is small, such as a laser, is focused by an optical system represented by a lens or a mirror, a focused spot becomes very small, so a light energy per unit area increases. Therefore, the projection display apparatus is designed such that, in a normal use mode, the amount of light from a high-power laser serving as an incorporated light source is adjusted by intensity modulation or time modulation of the light source using a movable aperture (not shown) of the illumination optical system 11 and the light valve 9 and the light beam is spread by the projection optical system 10 and distributed over a solid angle by the transmission-type screen 29. Thus, irradiance (light energy per unit area per unit time) and radiant exposure (light energy per unit area) become sufficiently small. A function or interlock for preventing erroneous manipulation or operation of a viewer is provided.

One of conventional examples is an example in which, in an image display apparatus for displaying an image on a screen using a high-energy laser as a laser light source, abnormality caused by the light source is detected. This is that, in order not to hinder viewing, an optical sensor represented by a photodiode is provided outside an effective screen area (display area) on the screen, whether or not the abnormality of the laser light source is caused is detected based on an output of the optical sensor, and generated laser light is stopped, reduced in amount, or blocked when it is determined that the abnormality is caused (see, for example, JP 2000-267621 A).

In the conventional projection display apparatus, the optical sensor is located outside the effective screen area (display area) on the screen, so it is possible to detect a state in which the screen is detached (together with the optical sensor), a state in which an alignment deviation in the projection optical system occurs, and a state in which the output abnormality of the laser light source. However, there is a problem that a light output cannot be detected within the effective screen area (display area). In addition, there is a problem that it is impossible to detect overturning or vibration of the display apparatus, cracking, disassembly, deformation, or breakage of a case or of a screen portion located on the effective screen area (display area), or the like.

In the external appearance of the projection display apparatus, there is a large window for providing, in a case 28 (see FIG. 6), the transmission-type screen 29 for displaying an image to the viewer 8, except small windows required for a ventilation opening, a wiring, and the like. When the transmission-type screen 29 is provided in the case 28, a space is obtained in an inner portion of the projection display apparatus by the case 28 and the transmission-type screen 29. Therefore, the projection display apparatus is divided into an outer portion of the apparatus (hereinafter referred to as an exterior) and the inner portion of the apparatus (hereinafter referred to as an interior) by using the case 28 and the transmission-type screen 29 as boundaries.

In a normal use mode, it is preferable to detect a leakage of light (abnormality of light output) to the exterior. When the viewer 8 disassembles, breaks, or deforms the case 28 and the transmission-type screen 29, the viewer 8 may go to the interior of the case 28. Even in a mode except the normal use mode, it is preferable to detect such abnormality quickly before image is displayed and to stop or block generated illumination light, thereby preventing the leakage of light.

SUMMARY OF THE INVENTION

The present invention has been made to solve the above-mentioned problems. An object of the present invention is to provide a projection display apparatus capable of reliably and promptly detecting not only abnormality of a light output of a laser light source to an exterior but also overturning, vibration, disassembly, deformation, or breakage of the display apparatus including a case and a screen.

According to an aspect of the present invention, there is provided a projection display apparatus, including: a case which has a light-shielding function and includes a window; a modulation light source provided in the case, for generating illumination light; a movable aperture provided in the case, for adjusting a light beam amount of the illumination light from the modulation light source; a light valve provided in the case, for adjusting a light amount based on an image signal to generate image light for forming an image from the illumination light; a projection optical system provided in the case, for enlarging a light beam of the image light from the light valve; a transmission-type screen provided in the window of the case, for displaying the image based on the image light which is enlarged and projected by the projection optical system; a detecting means for detecting abnormality of a light output from the light source to an exterior and abnormality of one of the case and the transmission-type screen; a warning and alarm means for generating at least one of sound and light that indicates the abnormalities; and a control means for controlling at least one of the light valve, the movable aperture, the modulation light source, and the warning and alarm means when the abnormalities are detected.

In the present invention, the projection display apparatus includes: a case which has a light-shielding function and includes a window; a modulation light source provided in the case, for generating illumination light; a movable aperture provided in the case, for adjusting a light beam amount of the illumination light from the modulation light source; a light valve provided in the case, for adjusting a light amount based on an image signal to generate image light for forming an image from the illumination light; a projection optical system provided in the case, for enlarging a light beam of the image light from the light valve; a transmission-type screen provided in the window of the case, for displaying the image based on the image light which is enlarged and projected by the projection optical system; a detecting means for detecting abnormality of a light output from the light source to an exterior and abnormality of one of the case and the transmission-type screen; a warning and alarm means for generating at least one of sound and light that indicates the abnormalities; and a control means for controlling at least one of the light valve, the movable aperture, the modulation light source, and the warning and alarm means when the abnormalities are detected. Consequently, it is possible to reliably and promptly detect not only the abnormality of the light output of a laser light source to the exterior but also overturning, vibration, disassembly, deformation, or breakage of the display apparatus including the case and the screen.

DETAILED DESCRIPTION OF THE PREFERRED EMBODIMENT

Embodiment 1

Figure 6:
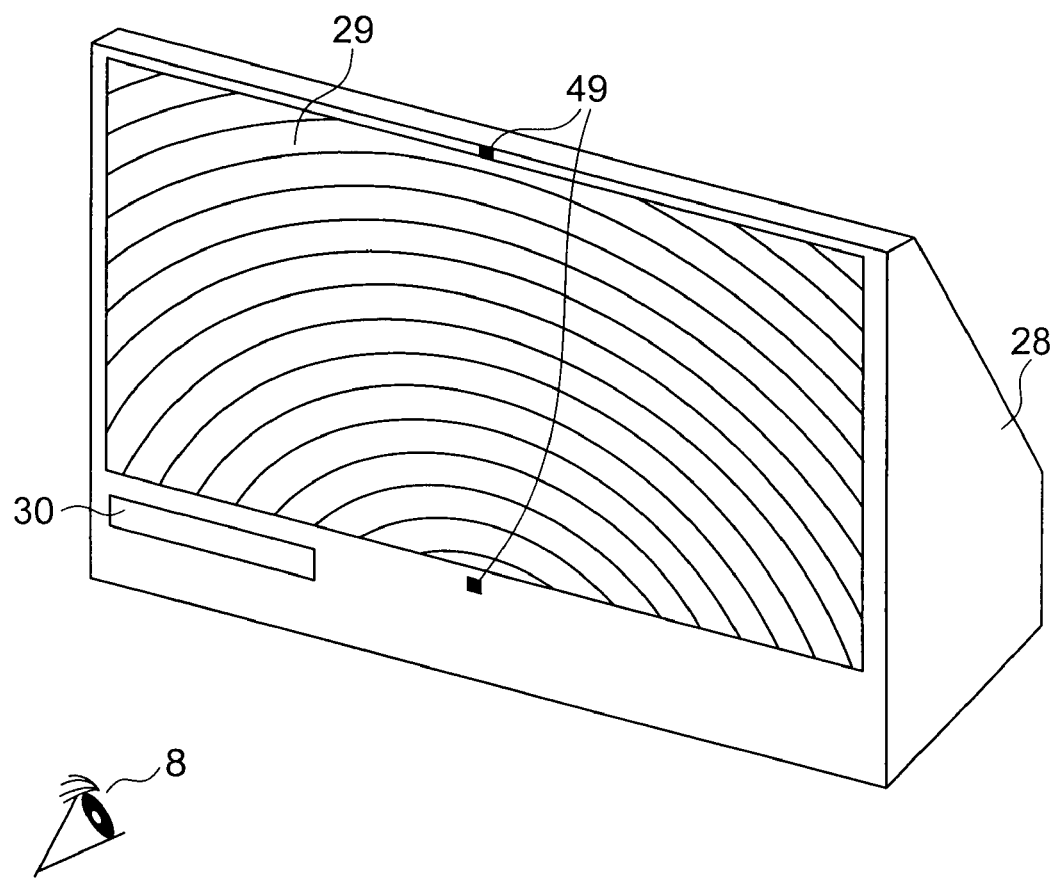
FIG. 6 is an external perspective view showing the projection display apparatus according to Embodiment 1 of the present invention.
Figure 7:
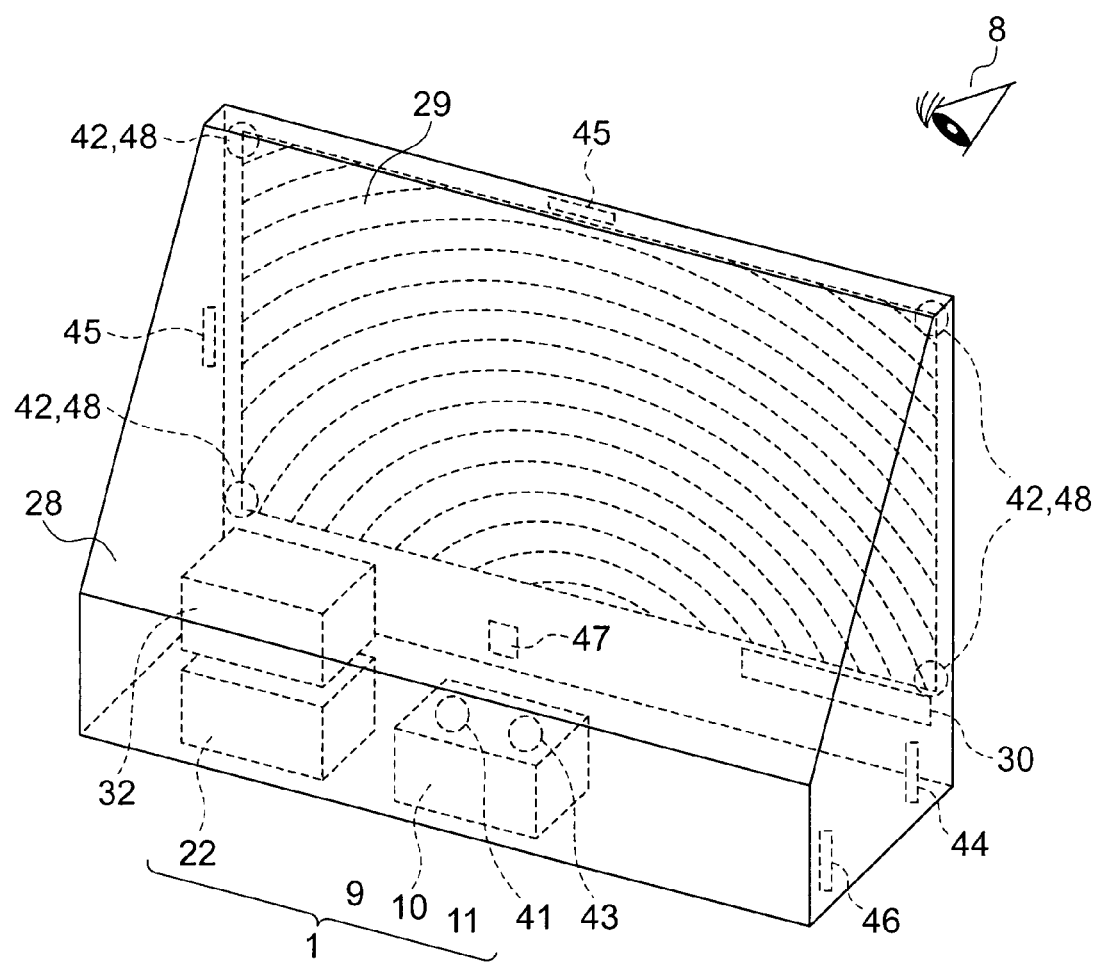
FIG. 7 is an external perspective view showing the projection display apparatus according to Embodiment 1 of the present invention.

FIGS. 6 and 7 are external appearance views showing a projection display apparatus according to Embodiment 1 of the present invention. FIG. 6 is a perspective view showing the projection display apparatus as viewed from a front side. FIG. 7 is a perspective view showing the projection display apparatus as viewed from a rear side. As shown in FIGS. 6 and 7, the projection display apparatus includes a case 28 having a light-shielding function, a transmission-type screen 29 which is inserted into a large window provided on a front side of the case 28 and used to display an image to a viewer 8, and a projector 1 incorporated in an inner portion of the case 28.

As shown in FIG. 7, the projector 1 includes a light source 22 for generating illumination light (hereinafter referred to as light), which is a modulation light source, an illumination optical system 11 for guiding a beam of the light to a light valve 9 to adjust the amount of light beam, the light valve 9 for adjusting the amount of light based on an image signal to generate image light for forming an image, and a projection optical system 10 for enlarging a light beam of the image light. According to this structure, the light generated from the light source 22 is efficiently guided to the light valve 9 by the illumination optical system 11 and the image formed by the light valve 9 is projected to the transmission-type screen 29 by the projection optical system 10.

In FIG. 7, although the projection optical system 10, the illumination optical system 11, and the light valve 9 are shown by a single block for convenience of drafting, these components are actually separated from one another. In FIG. 7, the number of each of the projection optical system 10, the illumination optical system 11, the light valve 9, and the light source 22 which are provided is one. However, in actuality, when an image is to be formed based on the three primary colors of light, three light sources 22 may be time-switched to form the image by the single illumination optical system 11 and the single light valve 9. Alternatively, the number of each of the light source 22, the illumination optical system 11, and the light valve 9 which are to be prepared may be three. When the number of each of the components is equal to or larger than one, the present invention is not limited to the above-mentioned structures. Namely, in the present invention, the number of each of the components is not specified and can be arbitrarily determined.

The illumination optical system 11 mainly includes lenses and mirrors. To be specific, the illumination optical system 11 includes a light guide means 24 (see FIG. 15) such as a rod integrator, a light tunnel, or an optical fiber and a movable aperture 23 whose aperture size is adjusted corresponding to an image (see FIG. 15). The light valve 9 is, for example, a transmissive liquid crystal device, a reflective liquid crystal device, a digital micro-mirror device, or the like and the present invention is not limited to those.

Figure 15:
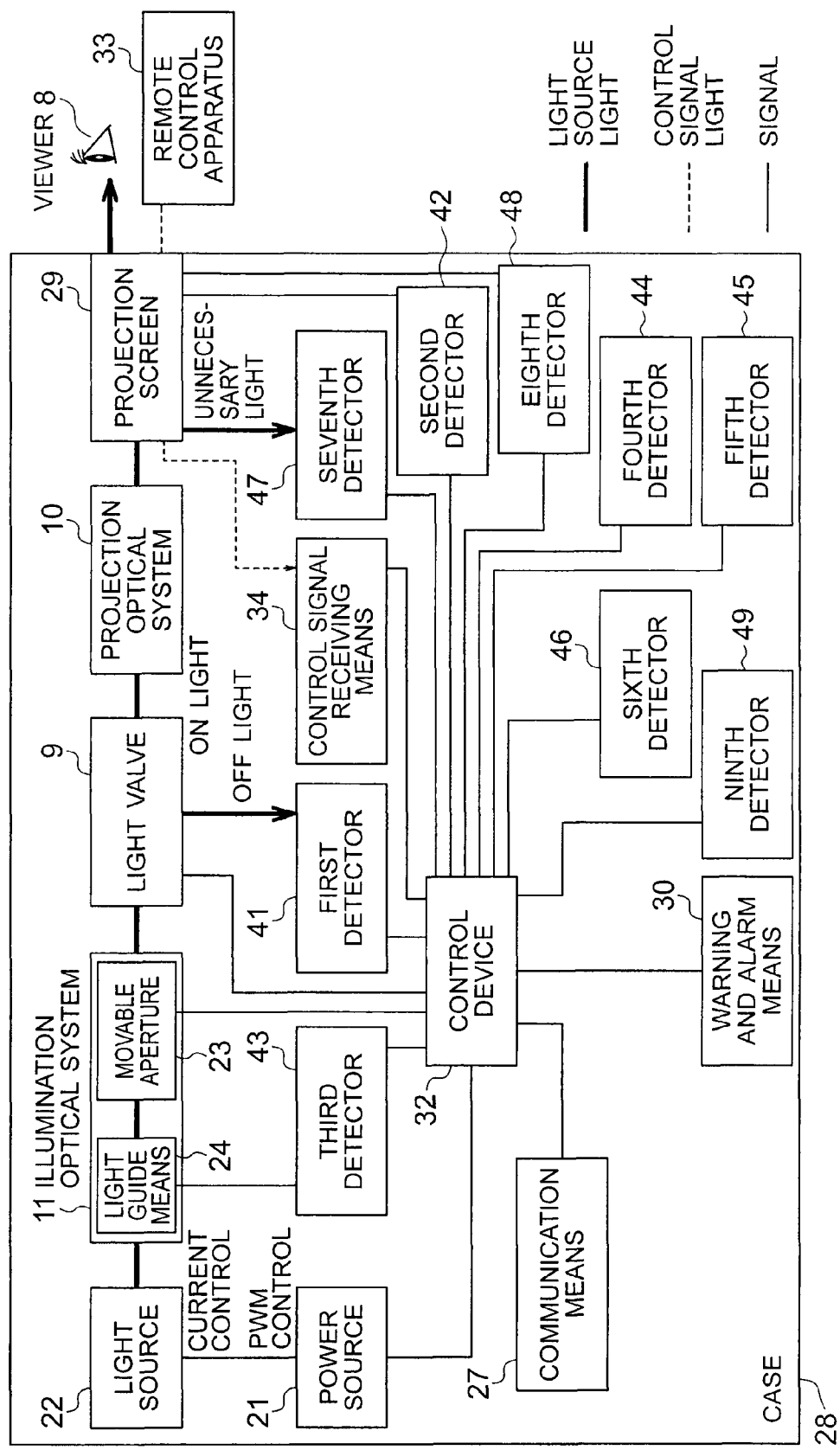
FIG. 15 is an explanatory diagram showing an internal structure of the projection display apparatus according to Embodiment 1 of the present invention.

FIG. 15 is a block diagram showing an internal structure of the projection display apparatus according to Embodiment 1 of the present invention. As shown in FIG. 15, the projection display apparatus according to Embodiment 1 of the present invention includes, the light valve 9, the projection optical system 10, the illumination optical system 11, a power source 21, the light source 22, a communication means 27, a warning and alarm means 30 for generating a warning and an alarm when the abnormality occurs, a control device 32 for controlling an internal operation, a control signal receiving means 34 for receiving a control signal from a remote control apparatus described later, a first detector 41 (optical sensor (for OFF light detection of the light valve 9)), second detectors 42 (shock sensors), a third detector 43 (light guide means removal detection sensor), a fourth detector 44 (internal pressure sensor), a fifth detector 45 (optical sensor (for foreign matter (extraneous substance) entrance detection)), a sixth detector 46 (gravity sensor or tilt sensor), a seventh detector 47 (optical sensor (for return light detection)), eighth detectors 48 (position sensors), and ninth detectors 49 (optical sensors (for exterior detection)), which are provided in the case 28. As shown in FIG. 6, of them, the warning and alarm means 30 and the ninth detector 49 are provided at positions viewed from the outside. The first to ninth detectors 41 to 49 each are referred to as a detector 31. All the first to ninth detectors 41 to 49 are not necessarily provided and thus may be selectively provided as appropriate. In FIG. 15, reference numeral 29 denotes the transmission-type screen 29. Reference numeral 33 denotes the remote control apparatus which is called a remote controller. The on/off operation of the power source 21 and the on/off operation of the light source 22 are performed in response to control signals transmitted from the remote control apparatus 33.

Figure 1:
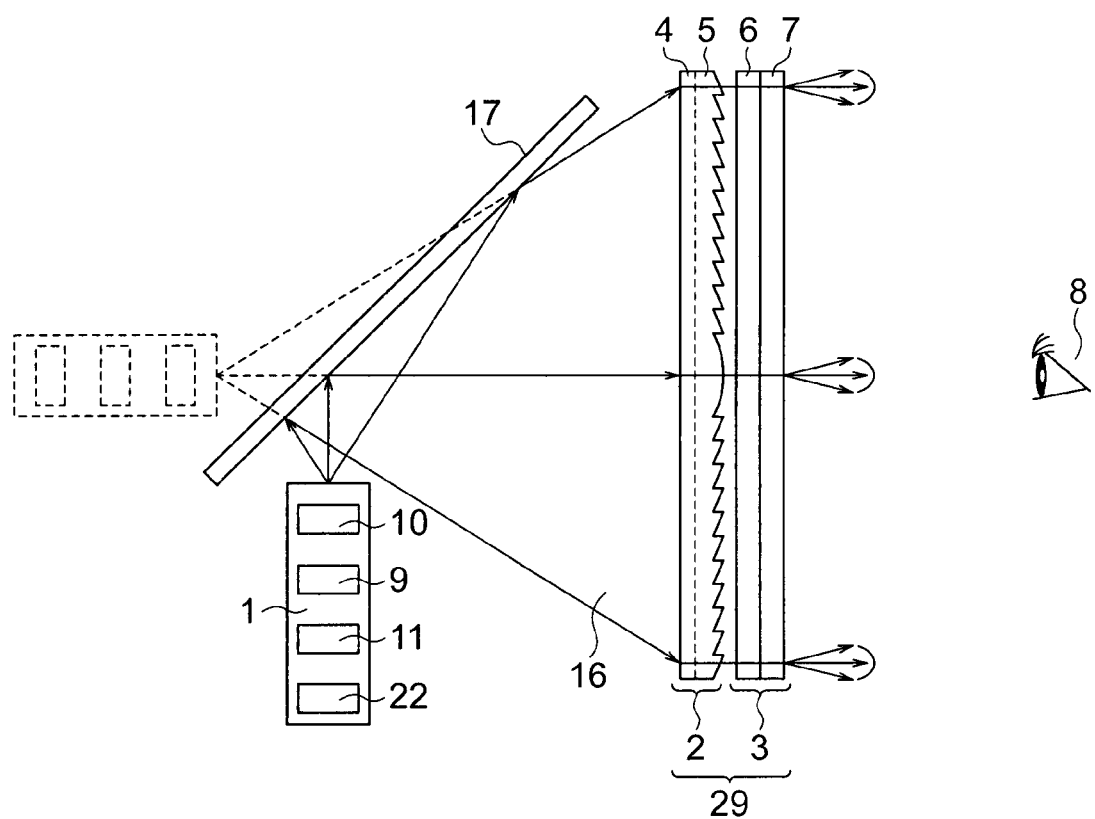
FIG. 1 is an explanatory view showing an operation of a normal projection display apparatus.
Figure 2:
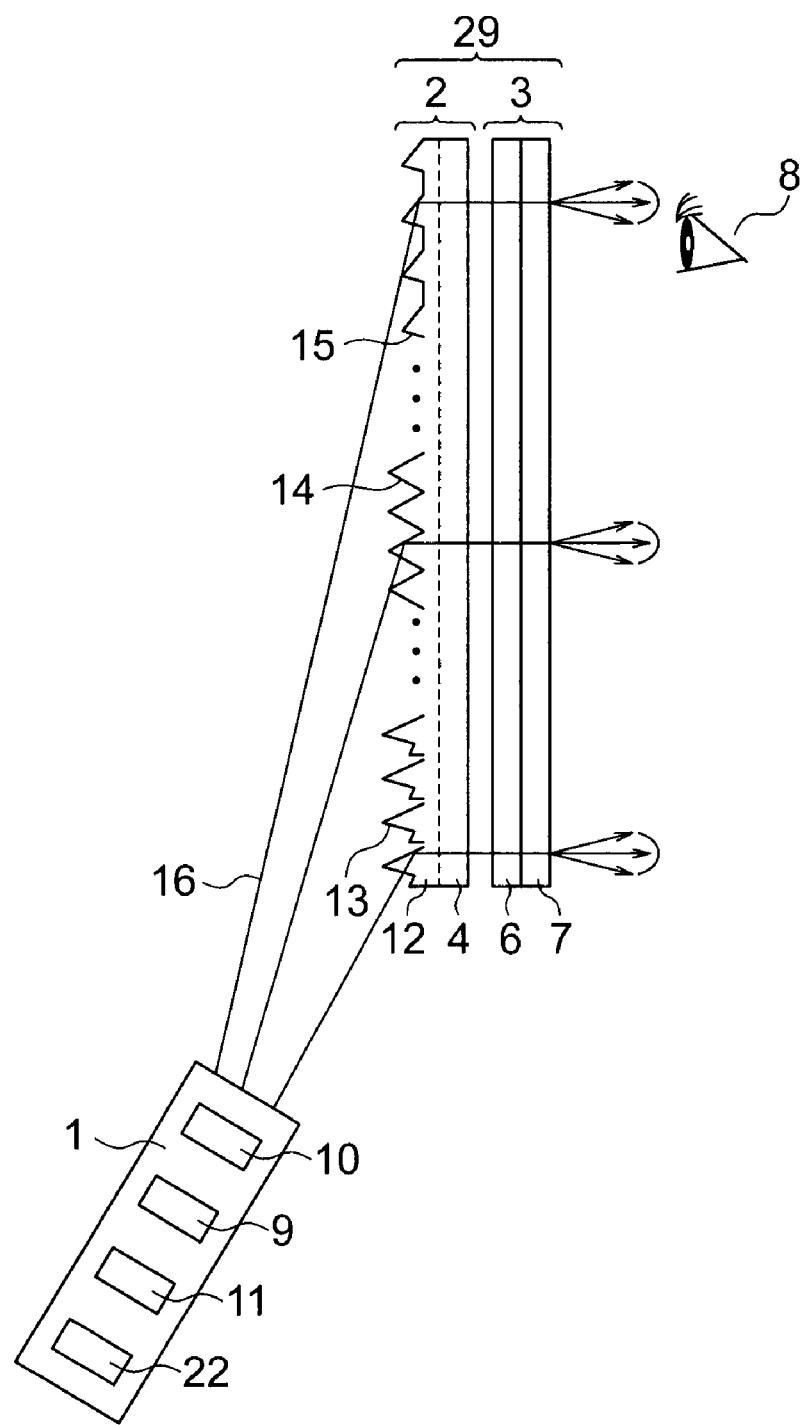
FIG. 2 is an explanatory view showing an operation of a projection display apparatus according to Embodiment 1 of the present invention.
Figure 3:
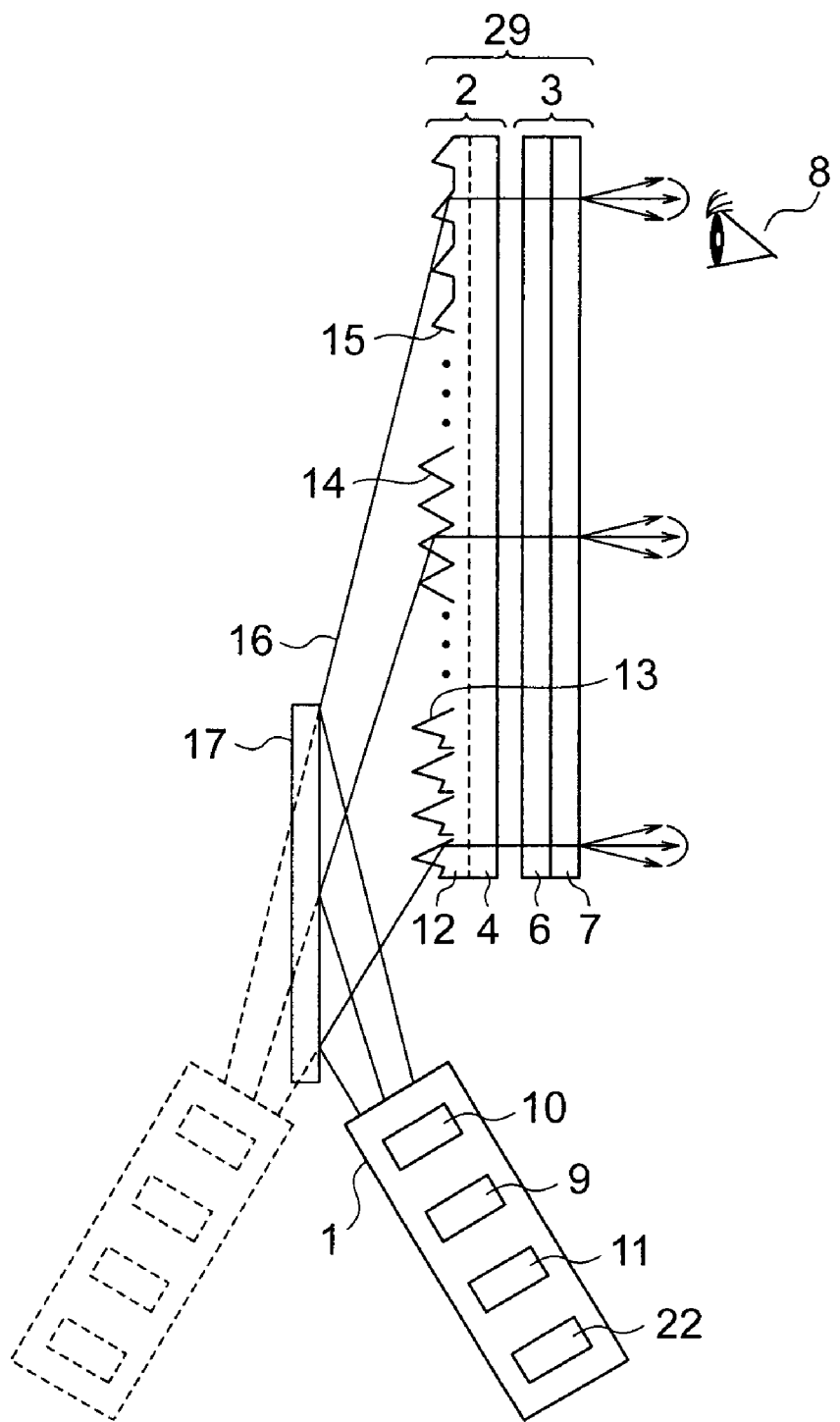
FIG. 3 is an explanatory view showing an operation of the projection display apparatus according to Embodiment 1 of the present invention.
Figure 4:
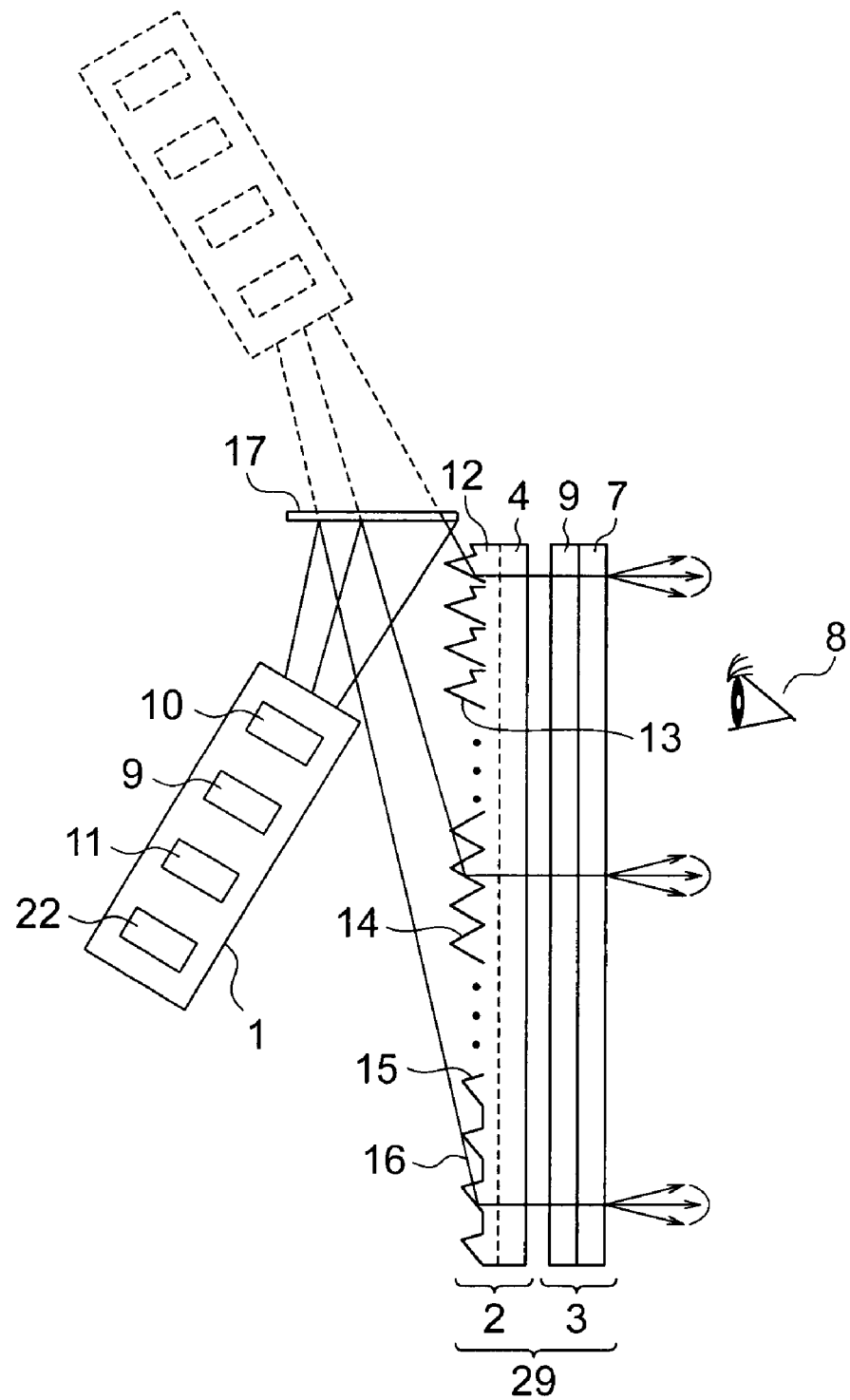
FIG. 4 is an explanatory view showing an operation of a projection display apparatus according to Embodiment 1 of the present invention.

As shown by the dotted line in FIG. 1, in the normal case of the projection display apparatus, the optical axis of the projection optical system 10 is substantially aligned with the center of the transmission-type screen 29. However, in order to thin the projection display apparatus in a depth direction or to reduce a size thereof, as shown by the solid line in FIG. 1, a light beam 16 is bent by the reflecting mirror 17. When the projection display apparatus is to be further thinned, as shown in FIG. 2, there is also a method of shifting the optical axis of the projection optical system 10 (not shown for convenience of plotting) to the outside of a screen area of the transmission-type screen 29 to project the light beam (image light) 16 from the projector 1 to the transmission-type screen 29 at a steep angle relative to the transmission-type screen 29. As shown in FIGS. 3 and 4, the light beam 16 may be bent on an optical path by the reflecting mirror 17 to reduce a thickness and a size of the projection display apparatus. In FIG. 3, the reflecting mirror 17 is located substantially parallel with the transmission-type screen 29. In FIG. 4, the reflecting mirror 17 is located close to an end of the transmission-type screen 29 and substantially perpendicular to the transmission-type screen 29. Note that the longitudinal orientation of the transmission-type screen 29 is not limited to that in each of the examples of FIGS. 3 and 4.

As shown in FIG. 2, the transmission-type screen 29 includes a Fresnel lens screen (Fresnel optical element) 2 for bending image light 16 from a projector 1 to a viewer 8 side and a light diffusing means 3 for diffusing the image light in a given dispersion angle range. The Fresnel lens screen (Fresnel optical element) 2 includes a Fresnel lens substrate 4 and a light exit side Fresnel lens 5. The light diffusing means 3 includes at least a lens component 6 and a light diffusion sheet 7. In many cases, the lens component 6 and the light diffusion sheet 7 are held by a substrate (not shown) made of a resin (such as PMMA, MS, or PC) or glass because of a very thin thickness of each thereof (several 10 micrometers to several 100 micrometers in thickness). In some cases, the substrate is located between the lens component 6 and the light diffusion sheet 7 or integrally formed with the light diffusion sheet 7. Therefore, the position of the substrate is not limited. The Fresnel lens substrate 4 which is described later may be commonly used for a Fresnel lens, the lens component 6, and the light diffusion sheet 7, as a substrate. The light diffusing means 3 is generally called a lenticular screen.

Figure 5:
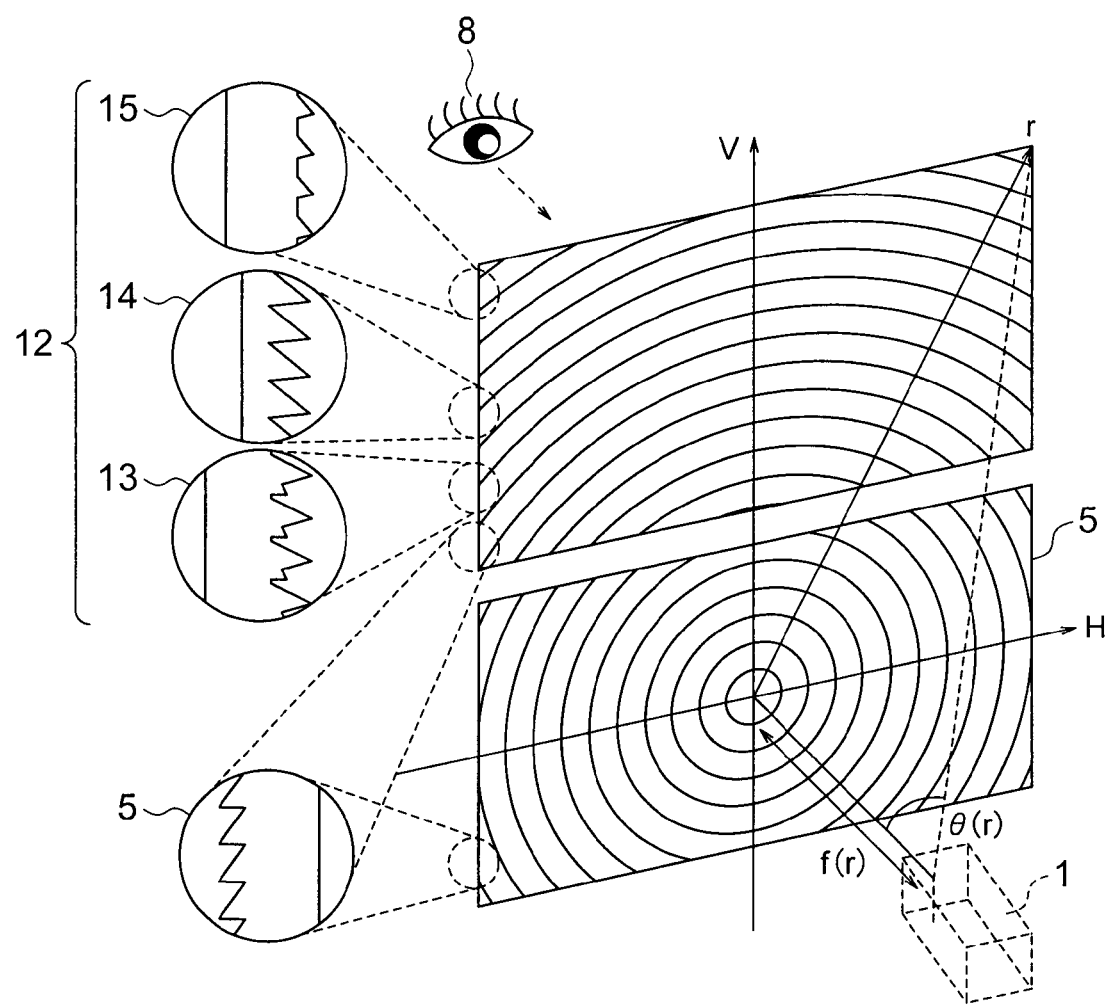
FIG. 5 is an explanatory view showing an operation of the projection display apparatus according to Embodiment 1 of the present invention.

In a general Fresnel lens, fine prisms are formed at a pitch smaller than a projection pixel size (for example, 1/10 of the pixel size), so the Fresnel lens is very thin (several 100 micrometers in thickness, including a prism portion). Therefore, the Fresnel lens substrate 4 (2 millimeters to 3 millimeters thickness) is provided to hold the Fresnel lens. The Fresnel lens substrate 4 is made of a resin (such as PMMA, MS, or PC) or glass in many cases. The Fresnel lens is directly formed onto the Fresnel lens substrate 4 in many cases. A Fresnel optical element including the Fresnel lens and the Fresnel lens substrate 4 is generally called a Fresnel lens screen. As shown in FIG. 5, the Fresnel lens is categorized into a light incident side Fresnel lens 12 and the light exit side Fresnel lens 5. The light incident side Fresnel lens 12 is a Fresnel lens which includes fine prisms and is formed on the light incident side. The light exit side Fresnel lens 5 is a Fresnel lens which includes fine prisms and is formed on the light exit side. The wide-angle projection optical system 10 for allowing the light beam to enter the screen as shown in each of FIGS. 2 to 4 at the steep angle normally has the center of a circular arc which is located outside the effective screen area (see, for example, an origin O in FIG. 5), so the light incident side Fresnel lens 12 or the light exit side Fresnel lens 5 is used. Each of FIGS. 2 to 4 shows the example using the light incident side Fresnel lens 12. The projection optical system 10 for projecting an image onto the transmission-type screen 29 from just the rear thereof as shown by the dotted line of FIG. 1 normally has the center of the optical axis which is located within the effective screen area (see, the origin O in FIG. 5 as described above), so the light exit side Fresnel lens 5 is used.

As shown in FIG. 5, examples of the light incident side Fresnel lens 12 includes a light incident side total-reflection and refraction Fresnel lens 13, a light incident side total-reflection Fresnel lens 14, and a light incident side partial total-reflection Fresnel lens 15.

Figure 14:
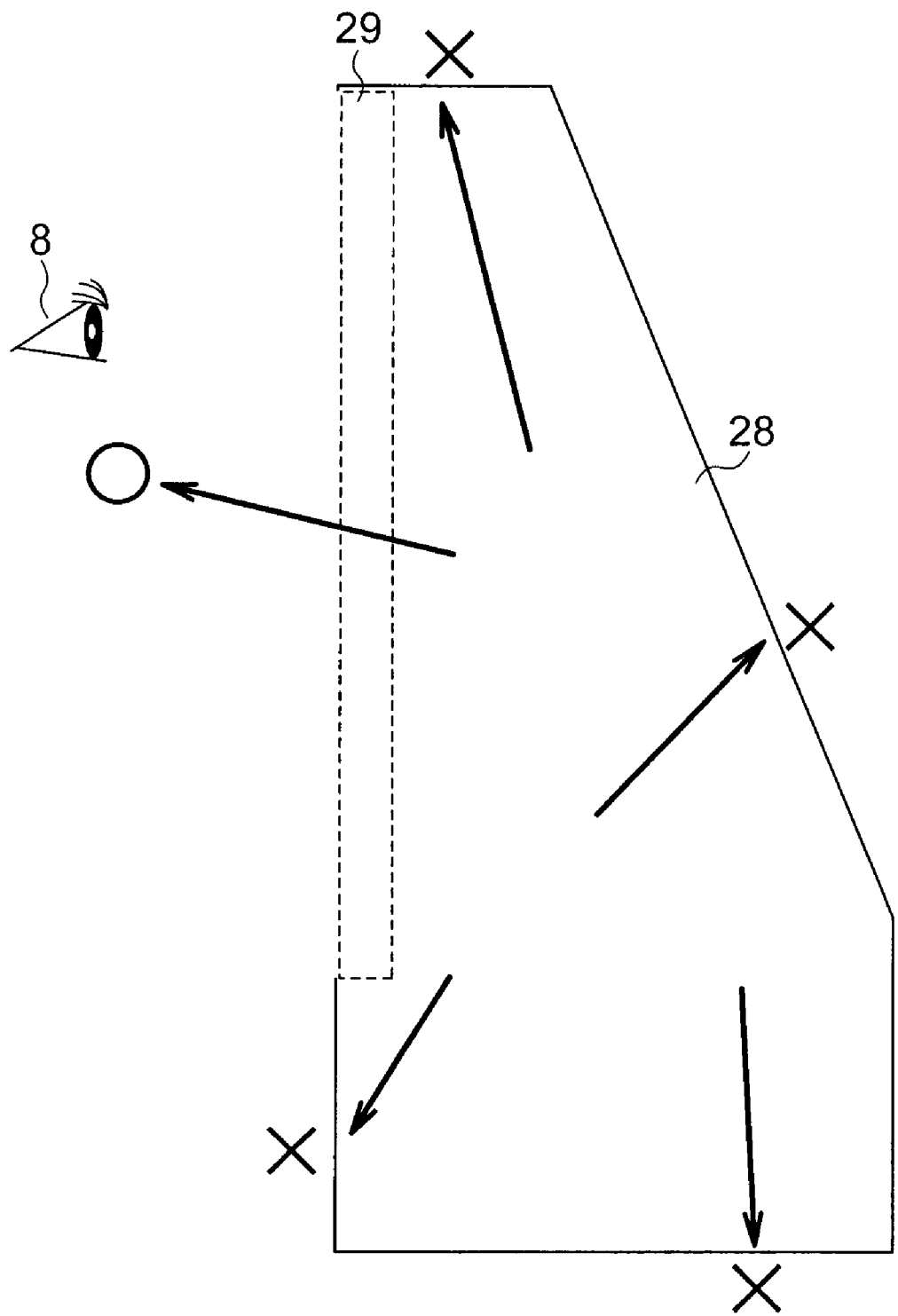
FIG. 14 is an explanatory view showing an operation of the projection display apparatus according to Embodiment 1 of the present invention.

The case 28 of the projection display apparatus is provided with small windows (not shown) required for a ventilation opening, a wiring, and the like. In order to prevent light beams leaking from the small windows, for example, partition plates are provided to block the light beams. In such a case, as shown in FIG. 14, light is exited through only the transmission-type screen 29 located in a large window of the case 28. Therefore, fundamentally, the amount of light exited through the transmission-type screen 29 is preferably adjusted to a suitable amount.

When the amount of light is to be changed, the followings can be adjusted as intended.

A: Time modulation of light intensity of light source 22
B: Movable aperture 23 of illumination optical system 11
C: Light valve 9

When the amount of light is to be changed, the followings cannot be adjusted as intended.

B': Light guide means 24 of illumination optical system 11
D: Projection optical system 10
E: Projection screen 29
F: Case 28

For example, the former group will be schematically described with reference to FIG. 15. The amount of light can be changed by adjusting (or controlling) a peak current of the light source 22, or by adjusting (or PWM-controlling) a duty ratio of pulse width modulation (PWM). Alternatively, the amount of light may be adjusted by opening or closing the movable aperture 23. Further, the amount of light may be adjusted by deflecting the light in a screen direction (ON light) or in a non-screen direction (OFF light) by means of the light valve 9.

On the other hand, the latter group is not fundamentally variable. Therefore, when the light guide means 24 is disconnected by vibration, overturning, disassembly, deformation, or breakage and thus light from the light source 22 does not reach the light valve 9, when the projection optical system 10 is displaced and thus the light beam 16 does not spread, when the transmission-type screen 29 is detached and thus light cannot be distributed over a solid angle, or when there is a hole in the case 28, the amount of light changes.

Here, the former group and the latter group are distinguished from each other. The former group is adjusted on the side closer to the light source 22 than the projection optical system 10, so the detector 31 is provided between the projection optical system 10 and the light valve 9. In the example of FIG. 15, the first detector 41 is provided as the detector 31 and includes an optical sensor for measuring the amount of light to sense the OFF light (light traveling in the non-screen direction) from the light valve 9. Therefore, the abnormality caused by any of the above-mentioned factors A, B, and C can be detected. That is, a case where the amount of OFF light from the light valve 9 becomes larger than a predetermined range is detected as an abnormal case. Note that sensing is performed while an image is not projected.

When light beams corresponding to all pixels travel in the screen direction, the amount of OFF light cannot be measured as a matter of course. In other words, it is difficult to measure the amount of OFF light while the image is being projected. Here, the light source 22 alternately generates light beams of at least three primary colors of red, green, and blue (R, G, and B) to produce respective color images. Then, 24 to 30 still images per second or several times larger than those are displayed to produce a moving image. In order to reduce the influence of retinal afterimage, it is essential to insert a black image between respective images. While the black image is displayed, the light source 22 is normally turned off for power saving. However, in this embodiment, the following operation may be performed to sense the OFF light. Only the light valve 9 is turned OFF to produce a black image. The light source 22 is maintained to be turned on. Then, the OFF light is measured for the detection of abnormality.

The latter group has no intended adjustment mechanism, so a state of a product and set values thereof are determined at the time of shipment, except for the case of a variation with time. Therefore, it is preferable to use a structure capable of detecting light exited to the exterior. However, when an optical sensor is provided outside the case 28 to accurately detect the light exited to the exterior, the usability of the projection display apparatus significantly reduces. The reason why the light is leaked to the exterior is that, for example, the light guide means 24, the projection optical system 10, or the transmission-type screen 29 is displaced or there is a hole in the case 28. The events may be caused by vibration, overturning, disassembly, deformation, or breakage. Thus, even in a case where the light exited to the exterior is not detected, when the events are detected before image display, the leakage of light can be also detected before image display.

The case 28 is provided with the large window in which the transmission-type screen 29 for displaying the image to the viewer 8 is located. When the ventilation opening and the like are sufficiently shielded from light, the light is exited from only the transmission-type screen 29 serving as a window in the normal use mode.

Figure 16:
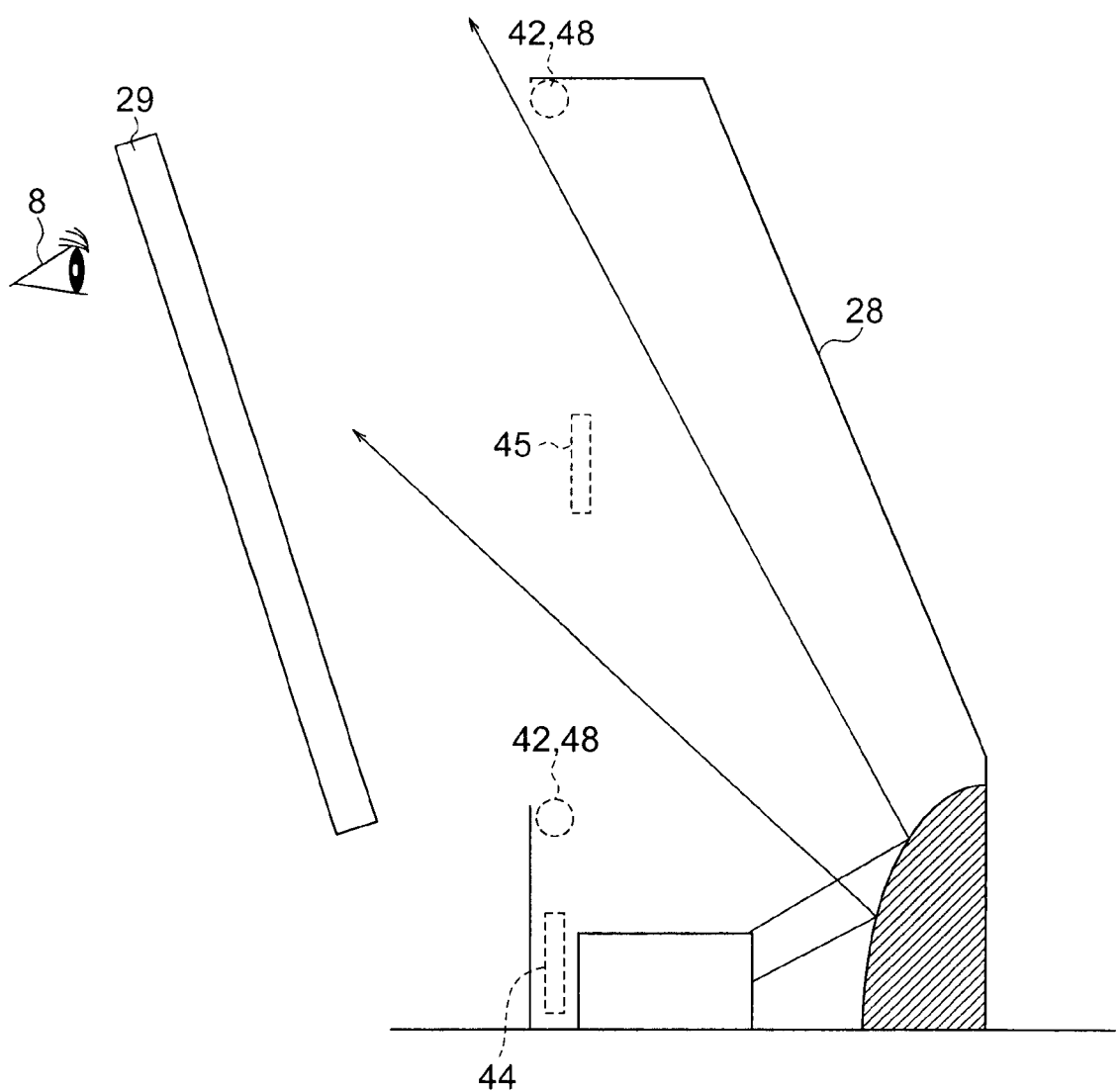
FIG. 16 is an explanatory view showing an operation of the projection display apparatus according to Embodiment 1 of the present invention.

In other words, as shown in FIG. 16, when the transmission-type screen 29 serving as the window is detached, broken, or displaced, the leakage of light occurs. Therefore, when a shock sensor serving as the second detector 42, such as a vibration sensor for detecting vibration, a sound wave sensor for detecting ultrasound, a frequency sensor for detecting a natural frequency, or an electrical resistance sensor for detecting a variation in electrical resistance value, is provided in the case 28 and close to the transmission-type screen 29, the application of shock to the transmission-type screen 29 can be detected. In addition, when a position sensor for detecting a positional relationship between the transmission-type screen 29 and the case 28 (distance therebetween), which serves as the eighth detector 48, such as a magnet switch or a mechanical switch, is provided in the case 28, the removal or displacement of the transmission-type screen 29 can be detected. When the same effect can be determined, the position of the second detector 42 and the position of the eighth detector 48 are not limited to the above-mentioned positions.

In the case where the wide-angle projection optical system 10 for allowing light to enter the transmission-type screen 29 at the steep angle (for example, FIGS. 2 to 4) is used as the projection optical system 10, for example, even when the transmission-type screen 29 is detached as shown in FIG. 16, a light beam does not go along the line of sight of the viewer 8 but travels to a ceiling. In other words, when the wide-angle projection optical system 10 is used, the light beam travels in a direction deviated from the line of sight of the viewer 8, so there is an advantage that the line of sight of the viewer 8 is not easily aligned with the traveling direction of the light beam. In the case of the wide-angle projection optical system 10 for allowing the light beam to enter the screen at the steep angle, the center of the optical axis thereof is located outside the effective screen area in many cases (see, for example, the origin O in FIG. 5). In other words, the center of a Fresnel lens having a one to one relationship with the projection optical system is located outside the effective screen area (display area), so there is a feature that the Fresnel lens whose center is located outside the effective screen area (display area) is formed in an arc shape. The Fresnel lens is not limited to the light incident side Fresnel lens 12 and the light exit side Fresnel lens 5. The wide-angle projection optical system 10 is not specified and can be arbitrarily determined. The wide-angle projection optical system 10 is composed, for example, of an optical system using a refractive lens, an optical system using a reflecting mirror, an optical system using a refractive lens and a reflecting mirror, and the like.

As shown in FIG. 16, the fourth detector for measuring an internal pressure of the projection display apparatus may be provided. When the power source 21 is turned on, the interior is slightly pressurized in order to prevent dust from entering from the ventilation opening. Therefore, when the pressure is sensed by the fourth detector 44 such as an air pressure sensor and compared with a predetermined reference value, whether or not the pressure of the interior is equal to a normal pressure can be detected. That is, when there is a hole in the case 28 or the transmission-type screen 29 or when the transmission-type screen 29 is detached (see, for example, FIG. 16 or 17), it is determined that the internal pressure is not equal to the normal pressure, so the leakage of light from the hole or the window from which the transmission-type screen 29 is detached can be detected before image display. In order to prevent the case 28 or the transmission-type screen 29 from being easily disassembled, a thread shape is set to a special shape such that the case or the transmission-type screen is not detached with a normal driver or a normal tool. Alternatively, a disassembly inhibition seal may be provided for not only the prevention of entrance of dust but also the maintenance of sealing. In order to be able to visually recognize the breakage of the seal, it is desirable to use, as the disassembly inhibition seal, a seal whose color or pattern is changed when the seal is broken. When the transmission-type screen 29 and the case 28 are sealed with the disassembly inhibition seal, the access to the interior is impossible. However, for redundancy, each of the detector 31, the control device 32, and the light source 22 may be sealed with the disassembly inhibition seal. The position of the fourth detector 44 is not limited to the above-mentioned position, and can be arbitrarily determined if the same effect can be determined.

Figure 17:
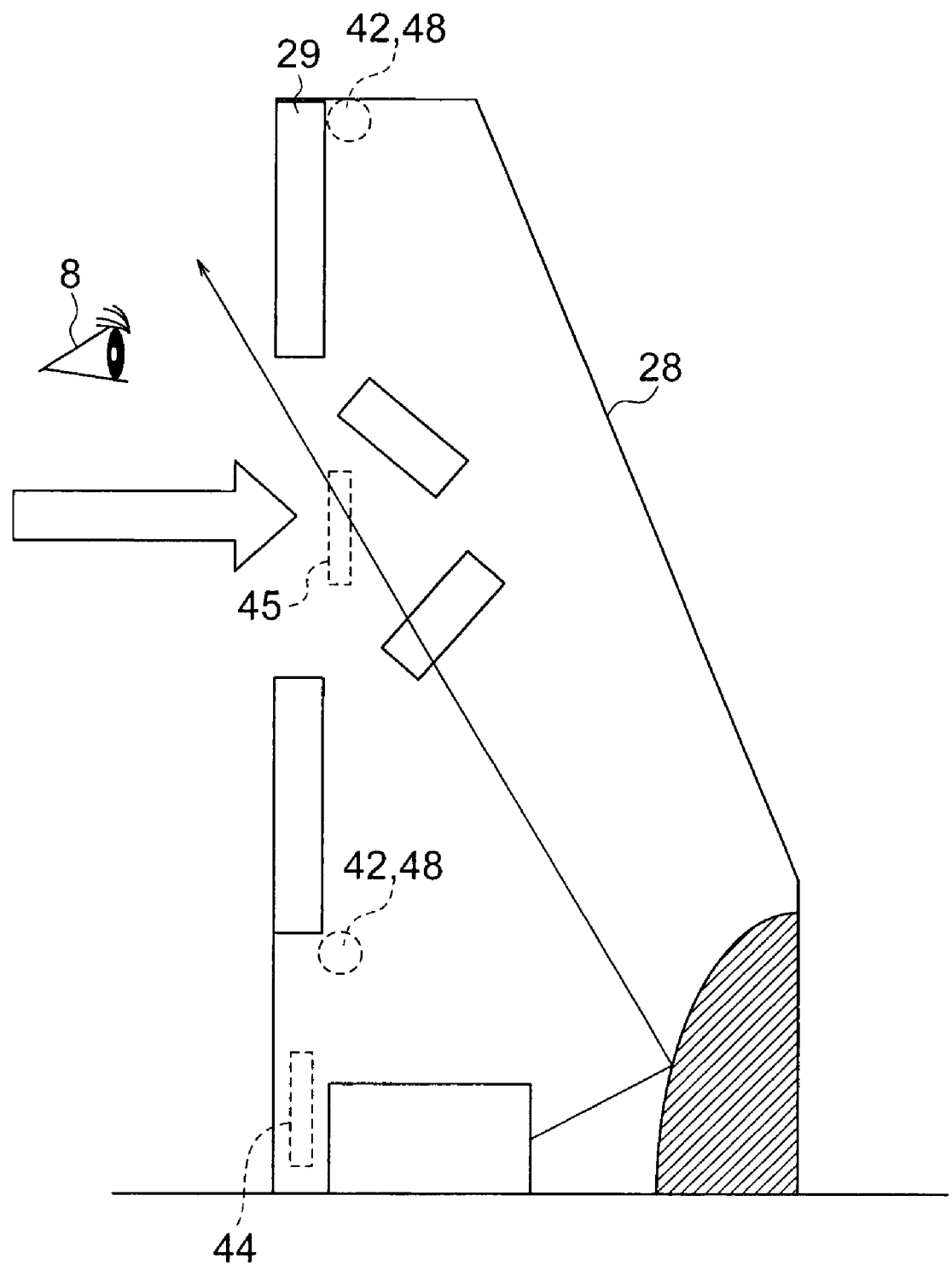
FIG. 17 is an explanatory view showing an operation of a projection display apparatus according to Embodiment 1 of the present invention.

There may be a case where, the viewer 8 disassembles, breaks, or deforms the case 28 and the transmission-type screen 29, so light enters the interior of the projection display apparatus as shown in FIG. 17. In order to prepare for such a case, an optical sensor such as an infrared sensor may be redundantly located as the fifth detector 45 in the case 28. The case 28 has the structure for guiding light from the projection optical system 10 to the transmission-type screen 29, so an optical path of the image light in a normal state corresponds to a space in which there is no shield. Therefore, when the entrance of a foreign matter (extraneous substance) is detected by an optical sensor, it can be detected that the abnormality such as disassembly, breakage, or deformation, of the transmission-type screen 29 occurs. When the same effect can be determined, the position of the fifth detector 45 is not limited to the above-mentioned position.

Figure 18:
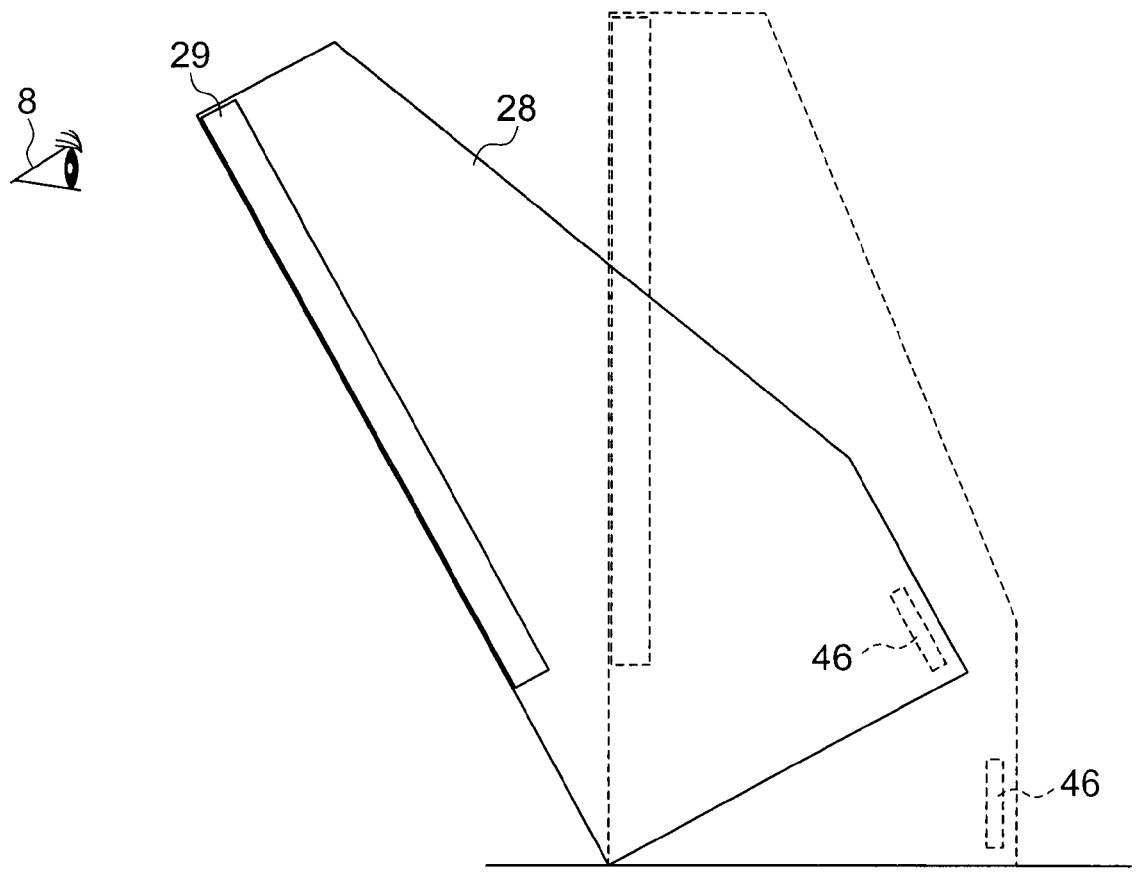
FIG. 18 is an explanatory view showing an operation of the projection display apparatus according to Embodiment 1 of the present invention.

The light source 22 provided in the projection display apparatus also serves as a heat source, so many projection display apparatuses are designed in view of waste heat. In this case, as shown in FIG. 18, when the projection display apparatus is tilted at an angle larger than necessary, it is likely to cause inconvenience due to the failure of waste heat. When the projection display apparatus is toppled, it is likely to break or deform the case 28 and the transmission-type screen 29 by the shock and cause the inconvenience due to the failure of the waste heat. Therefore, for example, the gravity sensor or the tilt sensor is provided as the sixth detector 46 in the case 28, the overturning or the tilt of the projection display apparatus can be detected. When the same effect can be determined, the position of the sixth detector 46 is not limited to the above-mentioned position.

A structure may be employed in which the light source 22 cannot be turned on when the light guide means 24 of the illumination optical system 11 is removed, displaced in position, or cut. For example, when a position sensor for detecting the position of the light guide means 24 is provided as the third detector 43 in each of incident and exit portions of the light guide means 24, the removal or the positional displacement of the light guide means 24 can be determined by the position sensor. For example, when an electrical resistance sensor for detecting a change in electrical resistance is provided as the third detector 43, resistances of a wiring and a conductive film which are located around the light guide means 24 can be checked to determine whether or not the light guide means 24 is disconnected. Therefore, the third detector 43 comprises a light guide means removal detection sensor.

The transmission-type screen 29 includes the Fresnel lens screen (Fresnel optical element) 2 for deflecting the light beam 16 from the light source 22 to the viewer 8 and the light diffusing means 3 for distributing the light beam over a solid angle. In addition, there is a case where a front plate (not shown) having an external protection function is provided on the side closest to the viewer 8. An antireflection layer (not shown) for reducing the reflection of light, an antiglare layer (not shown) for suppressing an appearance glare, an antistatic layer (not shown) for preventing the adhesion of dust which is caused by electrostatic action, or a hard coating layer (not shown) for surface protection may be provided on the surface of any one of the front plate and the light diffusing means 3.

In any cases, when an outermost member has an anti-scattering function, for example, it is possible to prevent a broken piece from entering the case 28. Each of the transmission-type screen 29 and the front plate is normally formed using a resin substrate. A glass substrate may be used because of external appearance, stiffness, flatness, and the like. In this case, a film made of, for example, resin is bonded to at least the outside of the glass substrate, so anti-scattering is possible even in the case where glass substrate is broken. When the film is bonded to the glass substrate, a frequency characteristic and the like change, so, for example, the detection using a frequency sensor is difficult. Therefore, the film is bonded to at least the outermost side. The film is not necessarily provided on the other sides.

Light is reflected or refracted on an interface between materials whose refractive indexes are different from each other (Snell's law). Except for the case where the total reflection condition is satisfied, light is divided into reflection light and refraction light, so the light traveling direction changes. A Fresnel lens in which the phenomenon is realized by a periodic prism structure is generally used as a screen. The Fresnel lens is designed so as to efficiently guide light to the viewer 8. However, light traveling in a direction other than a predetermined direction inevitably generates because of the above-mentioned phenomenon. Light other than regular light traveling toward the viewer 8 is generally called stray light or ghost light. This light causes the deterioration of image quality when the light is observed by chance by the viewer 8.

Figure 8:
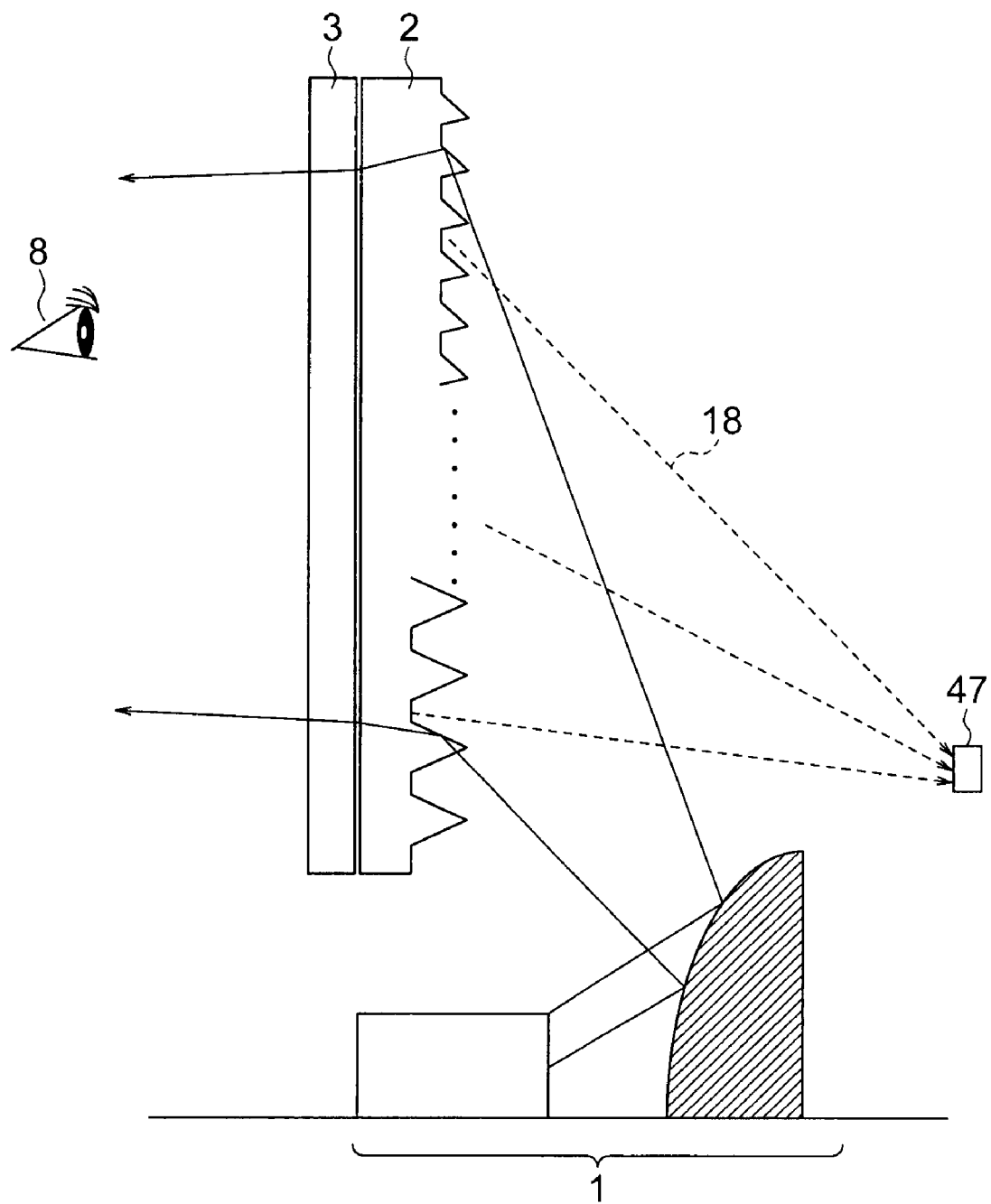
FIG. 8 is an explanatory view showing an operation of the projection display apparatus according to Embodiment 1 of the present invention.
Figure 10:
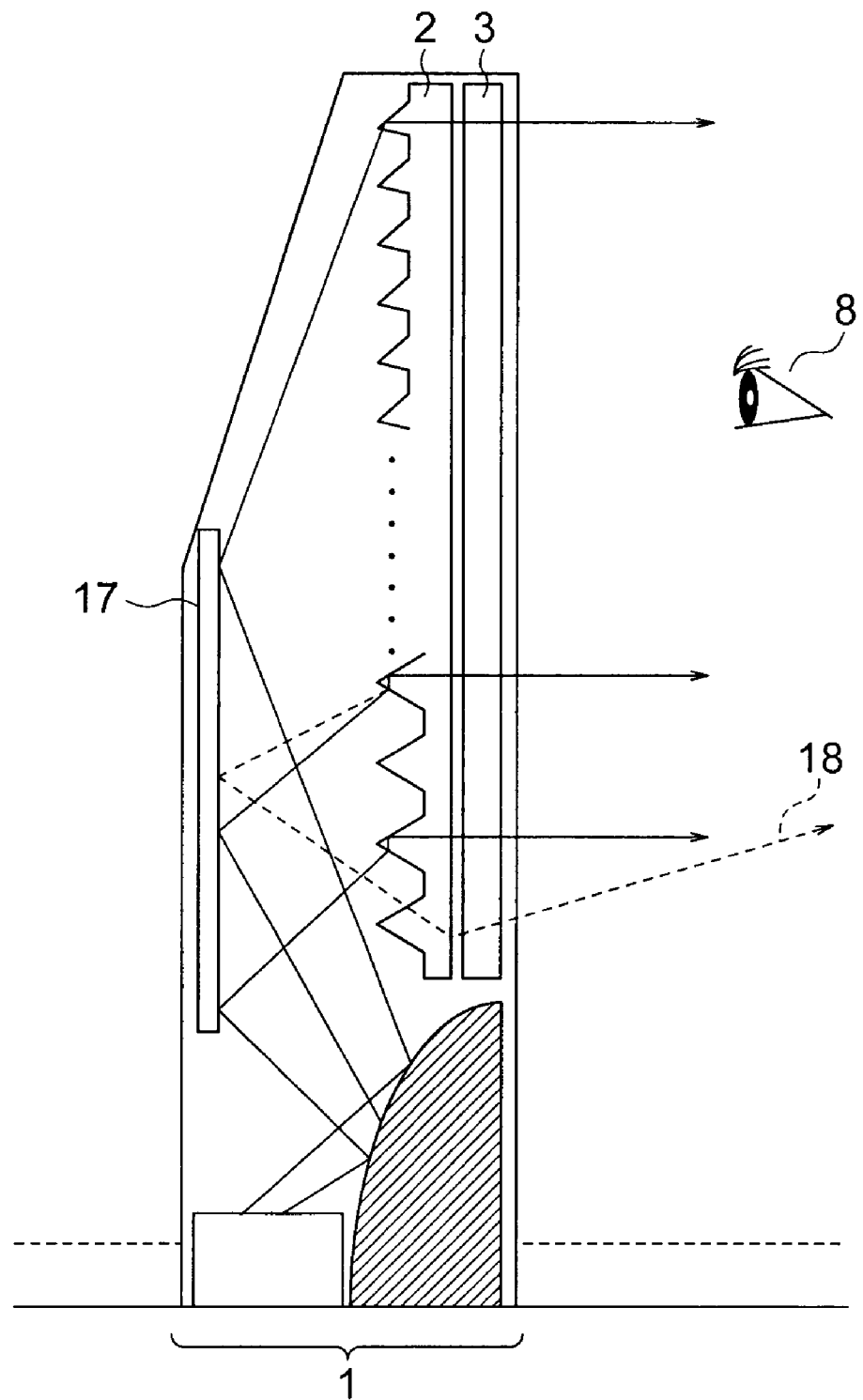
FIG. 10 is an explanatory view showing an operation of the projection display apparatus according to Embodiment 1 of the present invention.

In particular, the following has been known. When the light incident side Fresnel lens 12 whose light incident surface has a prism shape is used, for example, as shown in FIG. 8, there is stray light which is other than light deflected to the viewer 8, travels through the internal portion (normally several millimeters in thickness) of the transmission-type screen 29, and returns to the incident light surface of the projection optical system 10, that is, return light 18. As shown in FIG. 10, when the reflecting mirror 17 is provided on an optical path between the transmission-type screen 29 and the projection optical system 10, the return light 18 is reflected on the refracting mirror 17 and is then incident on the transmission-type screen 29 again, with the result that the light is observed by the viewer 8, thereby causing the deterioration of image quality (see, for example, JP 2002-196413 A (FIG. 3) and JP 2005-

Figure 9:
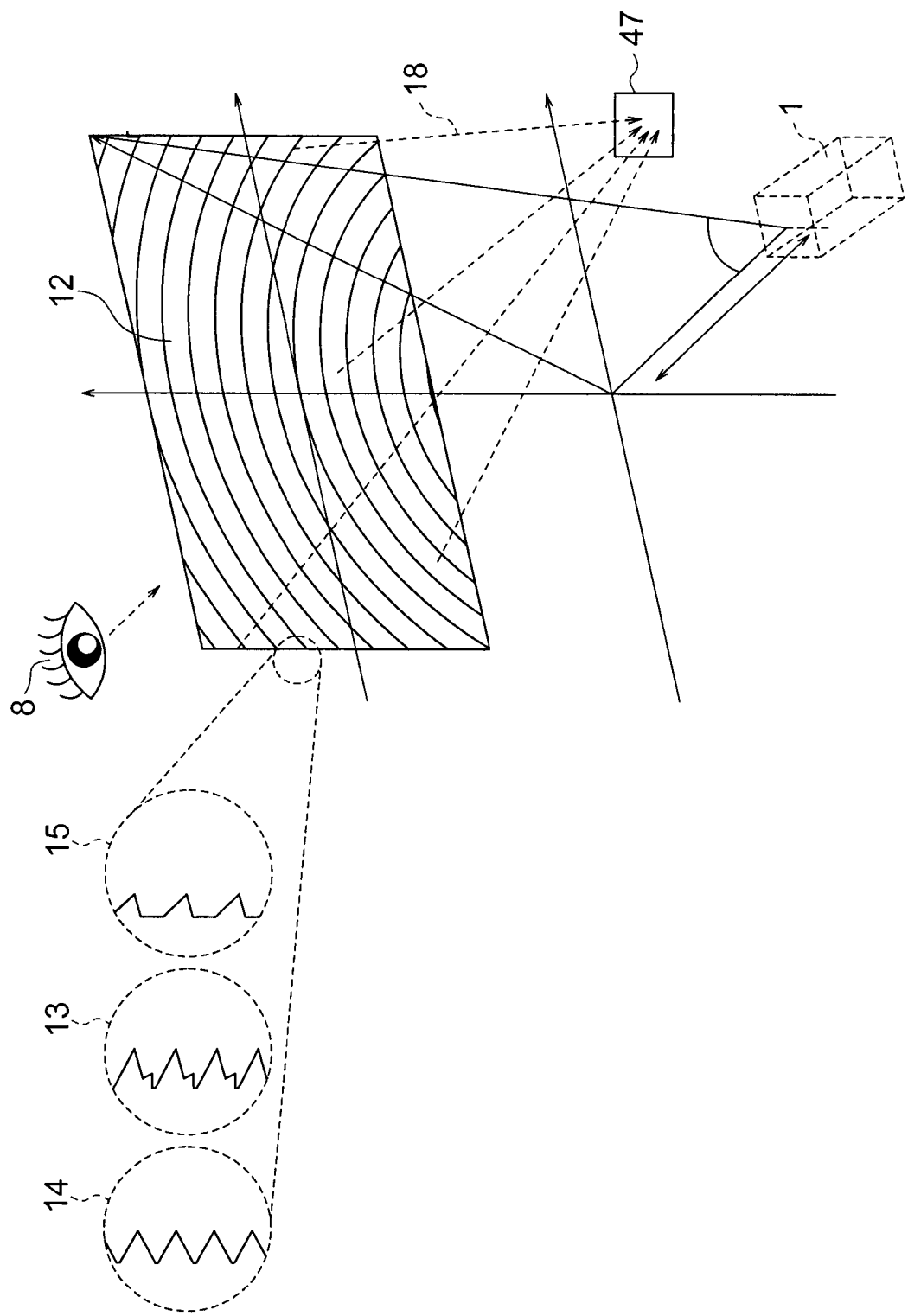
FIG. 9 is an explanatory view showing an operation of a projection display apparatus according to Embodiment 1 of the present invention.

043681 A (FIG. 13)). In particular, the light incident side Fresnel lens 12 is concentrically provided and the arc center thereof is outside the effective screen area (display area) of the transmission-type screen 29. Therefore, as shown in FIG. 9, the return light 18 is focused on the rear surface of the transmission-type screen 29 as viewed from the viewer 8 to form an image.

Figure 11:
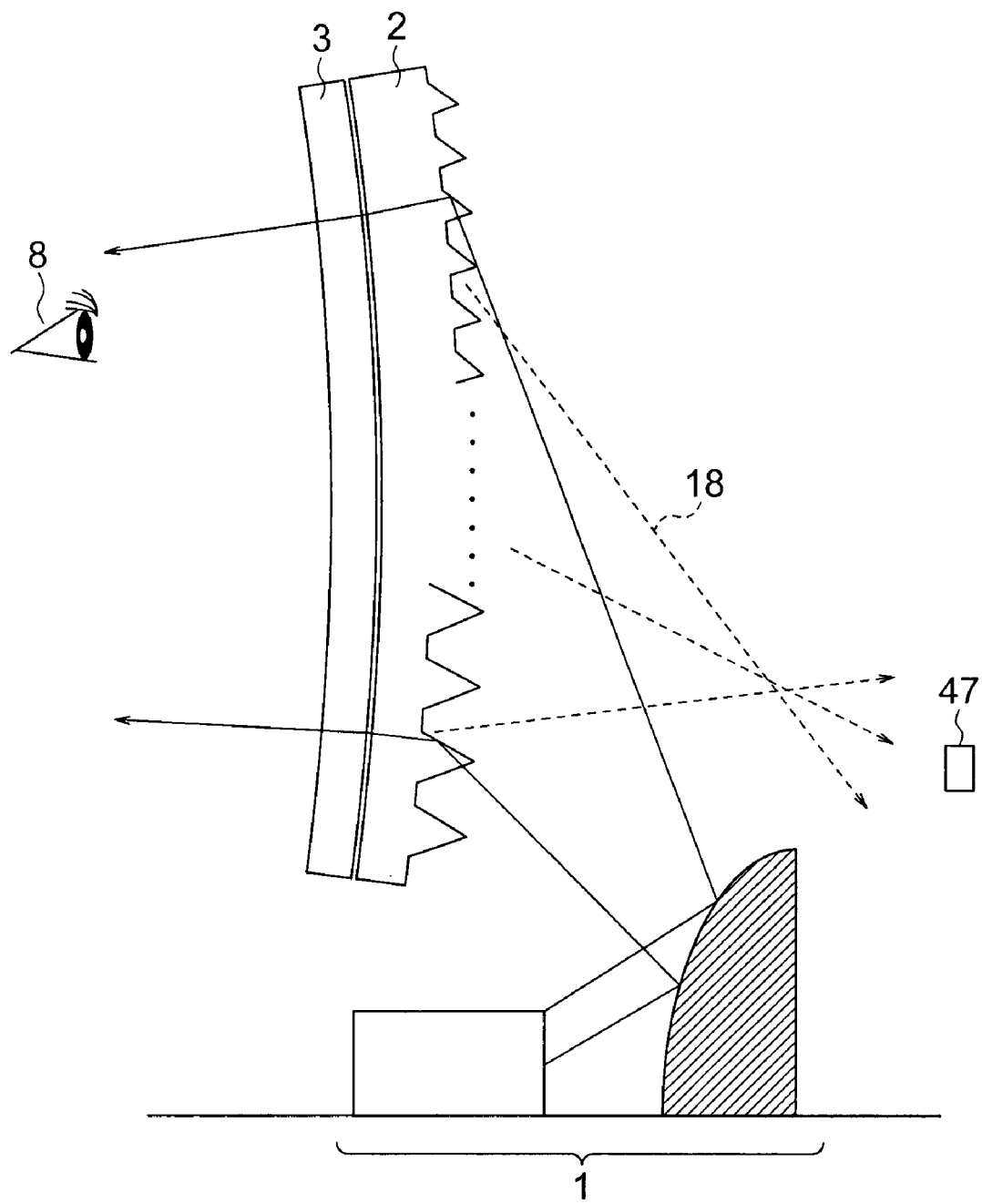
FIG. 11 is an explanatory view showing an operation of the projection display apparatus according to Embodiment 1 of the present invention.

The return light 18 is a part of the image light incident on the transmission-type screen 29 which travels through the transmission-type screen 29 and returns. As shown in FIG. 11, when the transmission-type screen 29 is detached, broken, displaced in position, or bent, a focus position of the return light 18 and the amount thereof change. Therefore, the seventh detector 47 including an optical sensor is provided to sense the amount of return light 18 by the seventh detector 47, so whether or not the transmission-type screen 29 is in a normal state can be detected. That is, when the amount of return light 18 is larger than a predetermined range, the abnormality is detected. This method has a merit missing in a conventional apparatus that not only an area which is located around the transmission-type screen 29 and not viewed by the viewer 8 but also an image display portion of the transmission-type screen 29 which is viewed by the viewer 8 can be directly checked.

When the light source 22 is turned on, for example, when the power source 21 is turned on or when the projection display apparatus is retuned from a sleep state, a screen image which makes sense to the viewer 8, including a product logo, status (channel, volume, and the like), and on screen display (OSD) is displayed. The screen image corresponds to a calibration test pattern for checking whether or not each of the light source 22, the optical systems 10 and 11, the movable aperture 23, the transmission-type screen 29, and the like satisfies predetermined performance, so an abnormal state can be detected without the recognition of the viewer 8. The necessary calibration test pattern is set such that the mount of light thereof becomes a small amount of light with which the viewer 8 can directly view. For example, the following operation may be performed. First, the light valve 9 is turned off to darken the screen area and off light is sensed by the first detector 41 to check the amount of light. After that, a test pattern is formed by the light valve 9. The return light 18 of the test pattern in which the amount of light is small is sensed by the seventh detector 47.

When the abnormality is detected by the detector 31, as described later, the control device 32 reduces the light output or causes the light source 22 to turn off. In addition to this, the control device 32 causes the warning and alarm means 30 to turn on or blink a lamp, thereby indicating the occurrence of abnormality. Alternatively, a voice generation function is provided for the warning and alarm means 30 to send, for example, a warning sound or a warning voice (message) to surrounding persons. As shown in FIG. 6, although it is preferable to place the warning and alarm means 30 in a position easily viewed by the viewer 8, the position is not necessarily limited. When the communication means 27 for obtaining television program information from the Internet is provided, the fact that the abnormality occurs may be sent to a service center through the Internet. The communication means 27 is not limited to the Internet unit and thus may be, for example, a telephone line unit. A communication system is not limited to one of a cable system and a wireless system. In addition, for service maintenance, the operation may be performed such that the control device 32 causes the warning and alarm means 30 to indicate what detector of the detectors 31 detected the abnormality.

Examples of a method of reducing the light output include a method of narrowing the movable aperture 23 of the illumination optical system 11 or blocking light on an optical path while the light source 22 is turned on by turning off the light valve 9 and a method of reducing the amount of light from the light source 22 by a reduction in peak current of the light source 22 or a reduction in duty ratio of pulse width modulation (PWM). The methods may be combined with each other. When power is not supplied to the light source 22, light is not generated. Therefore, a best method is that, for example, a breaker is turned off to stop power supply to the light source 22.

It is necessary to employ a structure in which the blocking of light or the stopping of power supply cannot be easily released by a user. For example, the light source 22, the power source 21, the control device 32, the detectors 31, and the warning and alarm means 30 may be enclosed by a physical key or released by the control device 32 only when a password which is inputted from the remote control apparatus 33 or the like and serves as a secret code key is correctly identical to a password registered in advance. In order to prevent the release, the light source 22 may be broken. Therefore, unless the light source 22 is exchanged for another light source, the light source 22 cannot be turned on again. In addition, in order to easily exchange the light source 22 for another light source by a service man for maintenance, not only the light source 22 alone but also a whole unit including the light source 22 which is sealed with the disassembly inhibition seal may be exchanged for another unit.

Figure 12:
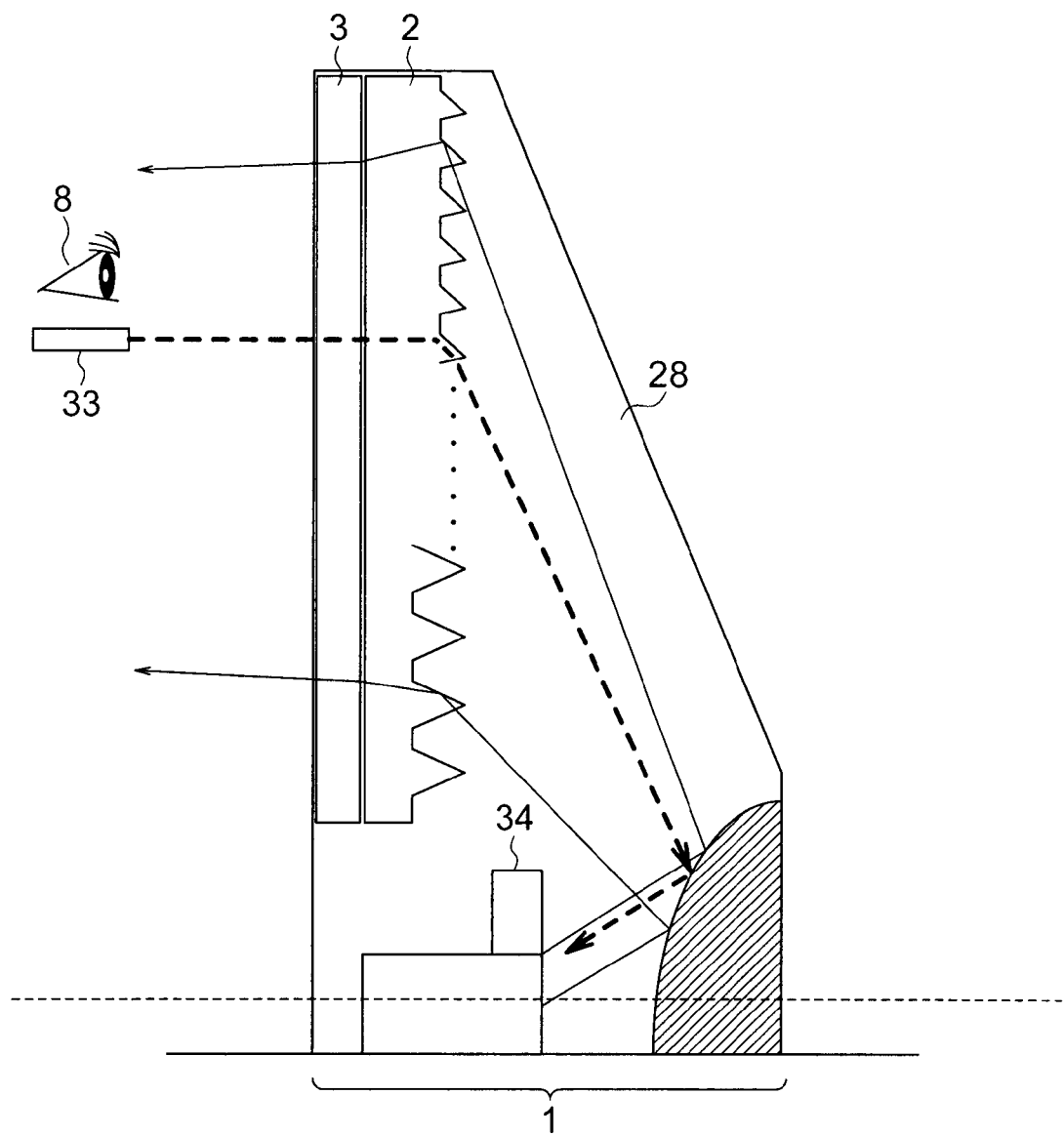
FIG. 12 is an explanatory view showing an operation of a projection display apparatus according to Embodiment 1 of the present invention.
Figure 13:
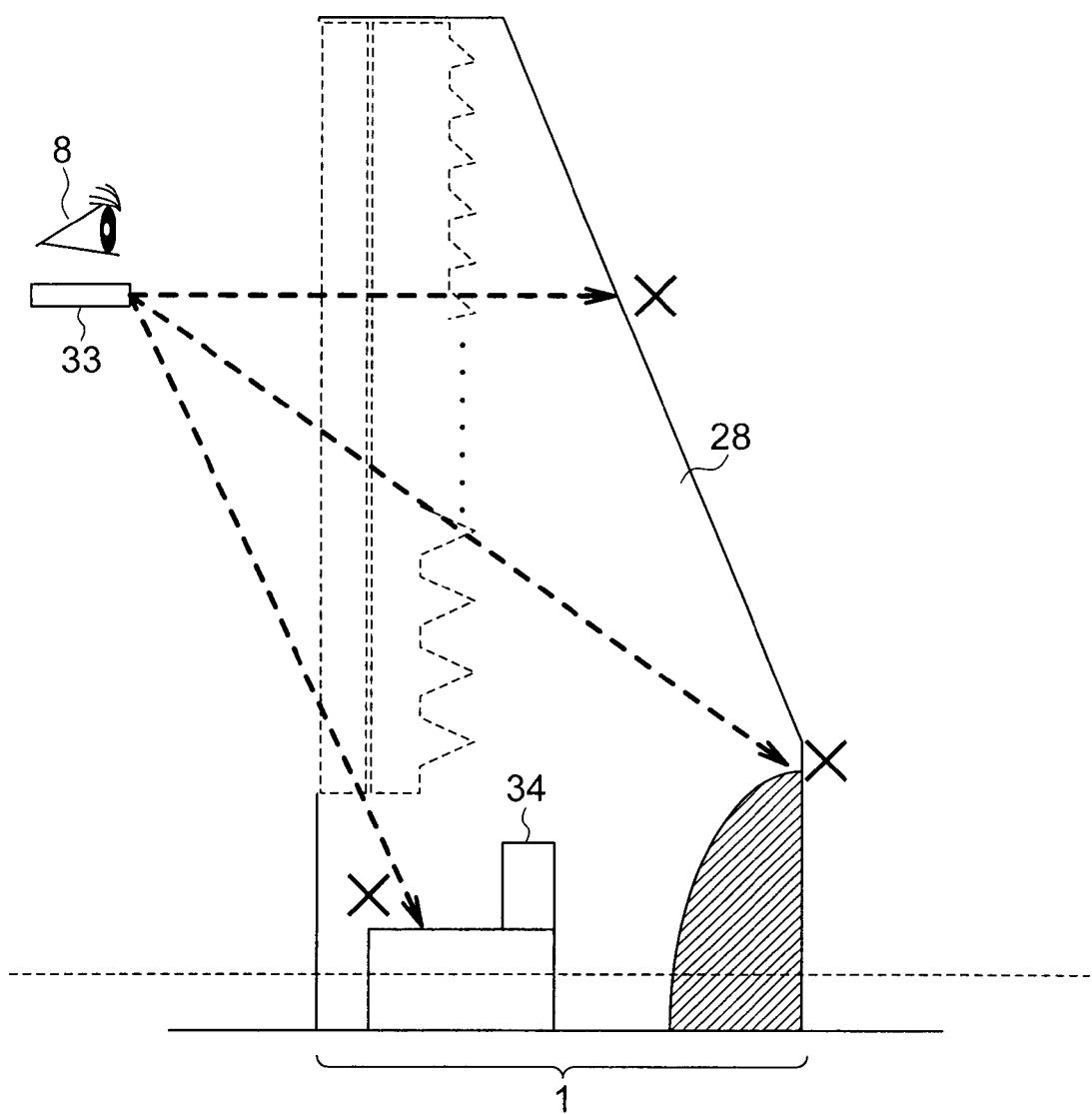
FIG. 13 is an explanatory view showing an operation of the projection display apparatus according to Embodiment 1 of the present invention.

The Fresnel lens screen (Fresnel optical element) 2 is a collimator lens for deflecting light from the projection optical system 10 to the viewer 8 and thus is said to be a field lens. In other words, this lens has a function for condensing light from the viewer 8 without depending on the light incident side Fresnel lens 12 and the light exit side Fresnel lens 5. For example, when a signal transmitted from the remote control apparatus 33 passes through the transmission-type screen 29 from the viewer 8 side, the signal focuses on the vicinity of the projection optical system 10. Therefore, as shown in FIG. 12, when the control signal receiving means 34 is provided in the vicinity of the projection optical system 10, the signal (light) can be efficiently received. That is, in the state in which the transmission-type screen 29 is detached, displaced, or broken, for example, in the state shown in FIG. 13, the signal (light) transmitted from the remote control apparatus 33 cannot be received. Although each of FIGS. 12 and 13 shows an example of the light incident side Fresnel lens 12, the light exit side Fresnel lens 5 may be located.

Transmission light from the projection display apparatus is exited from the transmission-type screen 29 serving as the window of the case 28. When the light source 22 is turned on while the transmission-type screen 29 is detached, displaced, or broken, the abnormality occurs. Therefore, before the light source 22 is turned on, signal light from the remote control apparatus 33 may be made incident on the transmission-type screen 29 from the viewer 8 side and received by the control signal receiving means 34 located in the vicinity of the projection optical system to determine that the screen is located. In other words, a structure may be employed in which the light source 22 cannot be turned on by a main body side of the projection display apparatus and is turned on inevitably by the remote control apparatus 33. The position of the control signal receiving means 34 is the vicinity of projection optical system in which the same effect is obtained and thus not limited to a position on the projection optical system.

An optical sensor for sensing the exterior of the case 28 is provided as the ninth detector in the case 28. For example, a camera is buried in a frame portion of the case 28 which is used to hold the transmission-type screen 29, thereby sensing that the viewer 8 approaches the transmission-type screen 29 of the case 28. When the transmission-type screen 29 is to be detached, disassembled, broken, shocked, the viewer 8 approaches the case 28. The abnormality of the light output is caused on the front surface of the transmission-type screen 29 serving as the window of the case 28. In particular, when the transmission-type screen 29 is detached, light from the light source 22 travels to a ceiling in the example shown in FIG. 16. Therefore, in the case where the viewer 8 approaches the case 28 as near as such a position as to allow the viewer 8 to view the transmission-type screen 29 from above, when the transmission-type screen 29 is detached, it is likely to align the line of sight of the viewer 8 with a traveling direction of a light beam from the light source 22. Thus, the position of the viewer 8 is detected. When the viewer 8 moves to the vicinity of the case 28 within a predetermined range therefrom while the light source 22 generates the illumination light, the amount of light from the light source 22 may be reduced by the control device 32. When the same effect can be determined, the position of the ninth detector 49 is not limited to the above-mentioned position.

When the detector 31 (any of the first to ninth detectors 41 to 49) detects the abnormality, the control device 32 may control to reduce the light intensity of the light source 22 to a value smaller than a current value.

Alternatively, when the detector 31 detects the abnormality, the control device 32 may control to reduce the aperture size of the movable aperture 23 to a value smaller than a current value.

Alternatively, when the detector 31 detects the abnormality, the control device 32 may control to form a black image using the light valve 9.

Alternatively, when the detector 31 detects the abnormality, the control device 32 may control to stop the power supply.

Alternatively, when the detector 31 detects the abnormality, the control device 32 may cause the warning and alarm means 30 to generate a sound or light for warning and alarm.

Alternatively, when the detector 31 detects the abnormality, the control device 32 may be released from an abnormal state when a password is received after the detection of abnormality.

The Fresnel lens screen (Fresnel optical element) 2 is selected corresponding to the characteristic of the projector 1 and the light diffusing means 3 is selected corresponding to optical characteristics such as a viewing angle and brightness of the transmission-type screen 29. Therefore, in many cases, the Fresnel lens screen 2 and the light diffusing means 3 are separately designed and manufactured and independently selected. In other words, the Fresnel lens screen (Fresnel optical element) 2 and the light diffusing means 3 may be separated from each other. When, the light incident side Fresnel lens 12 is to be selected as the Fresnel lens screen (Fresnel optical element) 2, for example, any one of the light incident side total-reflection and refraction Fresnel lens 13, the light incident side total-reflection Fresnel lens 14, and the light incident side partial total-reflection Fresnel lens 15 as shown in FIG. 5 is used.

When the light incident side Fresnel lens is combined with the lenticular lens screen, the respective separate structures are described here for easy understanding. However, in an actual case, the light incident side Fresnel lens and the lenticular lens screen may be used to form a single component. For example, a structure in which the light incident side Fresnel lens and the lenticular lens screen are bonded to each other through a bonding layer may be employed.

The projection display apparatus using the transmission-type screen 29 includes the projector 1 which has the light valve 9 for forming an image, the illumination optical system 11 for illuminating the light valve 9, the light source 22, and the projection optical system 10 for projecting the image, the transmission-type screen 29, and the light diffusing means 3. In addition, the projection display apparatus may be further provided with a constituent component which is any of the case 28, a holding mechanism, an air conditioner, a speaker, a television stand, an electrical circuit, a geometrical correction circuit, and a color correction circuit.

As described above, according to this embodiment, at least one of the first to ninth detectors 41 to 49 is provided. Therefore, when the abnormality of the light output of the light source 22 to the exterior and the abnormality such as overturning, vibration, disassembly, deformation, or breakage, of the projection display apparatus including the case 28 and the transmission-type screen 29 occur, the abnormalities can be promptly detected.

What is claimed is:
1. A projection display apparatus, comprising:
a case which has a light-shielding function;
a modulation light source provided in the case, for generating illumination light;
a movable aperture provided in the case, for adjusting a light beam amount of the illumination light from the modulation light source;
a light valve provided in the case, for adjusting a light amount based on an image signal to generate image light for forming an image from the illumination light;
a projection optical system provided in the case, for enlarging a light beam of the image light from the light valve;
a transmission-type screen provided in a window disposed to the case, for displaying the image based on the image light which is enlarged and projected by the projection optical system;
a detecting means for detecting an abnormality with respect to one of the quantity of a light output from the light source to an exterior, and an abnormality with respect to the case and/or the transmission-type screen, that would permit light to escape from the case;
a warning and alarm means for generating at least one of sound and light that indicates the abnormalities; and
a control means for controlling at least one of the light valve, the movable aperture, the modulation light source, and the warning and alarm means when the abnormalities are detected,
wherein the detecting means detects the abnormality when an amount of off light of the light valve is not within a predetermined range at a time when the light valve has shut off light to the projection optical system.

2. A projection display apparatus according to claim 1, wherein at least one or all of the detecting means, the control means, the modulation light source, the transmission-type screen, and the case are sealed with a disassembly inhibition seal.

3. A projection display apparatus according to claim 1, wherein a calibration image is displayed on the transmission-type screen at activation.

4. A projection display apparatus, comprising:
a case which has a light-shielding function;
a modulation light source provided in the case, for generating illumination light;

a movable aperture provided in the case, for adjusting a light beam amount of the illumination light from the modulation light source;
a light valve provided in the case, for adjusting a light amount based on an image signal to generate image light for forming an image from the illumination light;
a projection optical system provided in the case, for enlarging a light beam of the image light from the light valve;
a transmission-type screen provided in a window disposed to the case, for displaying the image based on the image light which is enlarged and projected by the projection optical system;
a detecting means for detecting an abnormality with respect to one of the quantity of a light output from the light source to an exterior, and an abnormality with respect to the case and/or the transmission-type screen, that would permit light to escape from the case;
a warning and alarm means for generating at least one of sound and light that indicates the abnormalities; and
a control means for controlling at least one of the light valve, the movable aperture, the modulation light source, and the warning and alarm means when the abnormalities are detected,
further comprising a light guide means provided between the modulation light source and the movable aperture, for guiding the illumination light from the modulation light source to the movable aperture,
wherein the detecting means detects the abnormality when the light guide means is not located in a predetermined position.

5. A projection display apparatus according to claim 4, wherein the detecting means detects the abnormality when the light guide means is disconnected.

6. A projection display apparatus, comprising:
a case which has a light-shielding function;
a modulation light source provided in the case, for generating illumination light;
a movable aperture provided in the case, for adjusting a light beam amount of the illumination light from the modulation light source;
a light valve provided in the case, for adjusting a light amount based on an image signal to generate image light for forming an image from the illumination light;
a projection optical system provided in the case, for enlarging a light beam of the image light from the light valve;
a transmission-type screen provided in a window disposed to the case, for displaying the image based on the image light which is enlarged and projected by the projection optical system;
a detecting means for detecting an abnormality with respect to one of the quantity of a light output from the light source to an exterior, and an abnormality with respect to the case and/or the transmission-type screen, that would permit light to escape from the case;
a warning and alarm means for generating at least one of sound and light that indicates the abnormalities; and
a control means for controlling at least one of the light valve, the movable aperture, the modulation light source, and the warning and alarm means when the abnormalities are detected,
wherein the detecting means detects the abnormality when an extraneous substance enters the case.

7. A projection display apparatus, comprising:
a case which has a light-shielding function;
a modulation light source provided in the case, for generating illumination light;
a movable aperture provided in the case, for adjusting a light beam amount of the illumination light from the modulation light source;
a light valve provided in the case, for adjusting a light amount based on an image signal to generate image light for forming an image from the illumination light;
a projection optical system provided in the case, for enlarging a light beam of the image light from the light valve;
a transmission-type screen provided in a window disposed to the case, for displaying the image based on the image light which is enlarged and projected by the projection optical system;
a detecting means for detecting an abnormality with respect to one of the quantity of a light output from the light source to an exterior, and an abnormality with respect to the case and/or the transmission-type screen, that would permit light to escape from the case;
a warning and alarm means for generating at least one of sound and light that indicates the abnormalities; and
a control means for controlling at least one of the light valve, the movable aperture, the modulation light source, and the warning and alarm means when the abnormalities are detected,
wherein the detecting means detects the abnormality when the case is subjected to one of tilt and overturning.

8. A projection display apparatus, comprising:
a case which has a light-shielding function;
a modulation light source provided in the case, for generating illumination light;
a movable aperture provided in the case, for adjusting a light beam amount of the illumination light from the modulation light source;
a light valve provided in the case, for adjusting a light amount based on an image signal to generate image light for forming an image from the illumination light;
a projection optical system provided in the case, for enlarging a light beam of the image light from the light valve;
a transmission-type screen provided in a window disposed to the case, for displaying the image based on the image light which is enlarged and projected by the projection optical system;
a detecting means for detecting an abnormality with respect to one of the quantity of a light output from the light source to an exterior, and an abnormality with respect to the case and/or the transmission-type screen, that would permit light to escape from the case;
a warning and alarm means for generating at least one of sound and light that indicates the abnormalities; and
a control means for controlling at least one of the light valve, the movable aperture, the modulation light source, and the warning and alarm means when the abnormalities are detected,
wherein the detecting means detects the abnormality when a viewer approaches a vicinity of the case while the modulation light source generates the illumination light.

9. A projection display apparatus, comprising:
a case which has a light-shielding function;
a modulation light source provided in the case, for generating illumination light;
a movable aperture provided in the case, for adjusting a light beam amount of the illumination light from the modulation light source;
a light valve provided in the case, for adjusting a light amount based on an image signal to generate image light for forming an image from the illumination light;
a projection optical system provided in the case, for enlarging a light beam of the image light from the light valve;

a transmission-type screen provided in a window disposed to the case, for displaying the image based on the image light which is enlarged and projected by the projection optical system;

a detecting means for detecting an abnormality with respect to one of the quantity of a light output from the light source to an exterior, and an abnormality with respect to the case and/or the transmission-type screen, that would permit light to escape from the case;

a warning and alarm means for generating at least one of sound and light that indicates the abnormalities; and a control means for controlling at least one of the light valve, the movable aperture, the modulation light source, and the warning and alarm means when the abnormalities are detected, wherein the transmission-type screen comprises a Fresnel optical element provided in the case, for deflecting the image light from the projection optical system, a light diffusing means provided outside the Fresnel optical element, for distributing the image light by a lens component and a diffusing sheet; and a substrate provided outside the light diffusing means and formed of one of a resin and a glass bonded with a resin film, wherein the Fresnel optical element comprises Fresnel lenses concentrically arranged, and a center of arcs of concentric circles is located outside a display area of the transmission-type screen, and wherein the detecting means detects the abnormality when an amount of return light exiting the Fresnel lenses toward the projection optical system again is not within a predetermined range.

10. A projection display apparatus according to claim 1, further comprising:

a remote control apparatus for operation; and a control signal receiving means for receiving a control signal from the remote control apparatus, wherein when the control signal from the remote control apparatus is received through the transmission-type screen by the control signal receiving means, power is supplied to the light source.

11. A projection display apparatus according to claim 1, wherein the control means controls the light source to reduce an intensity thereof to a value smaller than a current value when the detecting means detects the abnormality.

12. A projection display apparatus according to claim 1, wherein the control means controls the movable aperture to reduce a diaphragm thereof to a value smaller than a current value when the detecting means detects the abnormality.

13. A projection display apparatus according to claim 1, wherein the control means controls to form a black image using the light valve when the detecting means detects the abnormality.

14. A projection display apparatus according to claim 1, wherein the control means performs control to stop power supply when the detecting means detects the abnormality.

15. A projection display apparatus according to claim 1, wherein the control means causes the warning and alarm means to generate one of sound and light for warning and alarm when the detecting means detects the abnormality.

16. A projection display apparatus according to claim 1, wherein the control means performs release processing at release from an abnormal state when a password is received.

17. A projection display method, comprising:

a step of generating illumination light by using a modulation light source provided in a case having a light-shielding function;

a step of adjusting a light beam amount of the illumination light by using a movable aperture provided in the case;

a step of adjusting a light amount based on an image signal by using a light valve provided in the case so as to generate image light for forming an image from the illumination light;

a step of enlarging a light beam of the image light by using a projection optical system provided in the case;

a step of projecting and displaying the image based on the enlarged image light on a transmission-type screen provided in a window disposed to the case;

a step of detecting an abnormality with respect to one of a quantity of a light output from the light source to an exterior, and an abnormality with respect to the case and/or the transmission-type screen that would permit light to escape from the case, by detecting that an amount of off light of the light valve is not within a predetermined range at a time when the light valve has shut off light to the projection optical system;

a step of generating at least one of sound and light that indicates the detected abnormalities by using a warning and alarm device; and a step of controlling at least one of the light valve, the movable aperture, the modulation light source, and the warning and alarm device when the abnormalities are detected.

* * * * *